(12) United States Patent
Yoshikawa et al.

(10) Patent No.: US 6,633,729 B1
(45) Date of Patent: Oct. 14, 2003

(54) OPTICAL APPARATUS, OPTICAL APPARATUS DRIVING UNIT AND CAMERA SYSTEM

(75) Inventors: Kazumasa Yoshikawa, Utsunomiya (JP); Satoshi Natsume, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/696,920

(22) Filed: Oct. 26, 2000

(30) Foreign Application Priority Data

Oct. 28, 1999 (JP) ............................................ 11-307146

(51) Int. Cl.[7] ............................................. G03B 17/00
(52) U.S. Cl. ............................................ 396/76; 396/86
(58) Field of Search .......................... 396/72, 76, 79, 396/86, 131; 348/211, 213, 335, 357, 358, 211.99, 211.6

(56) References Cited

U.S. PATENT DOCUMENTS

| | | | | |
|---|---|---|---|---|
| 4,244,006 A | * | 1/1981 | Kitahara et al. ............ 348/213 |
| 5,471,296 A | * | 11/1995 | Parker et al. .......... 356/139.06 |
| 5,929,904 A | * | 7/1999 | Uchida ........................ 348/211 |
| 6,035,137 A | * | 3/2000 | Kaneko et al. ................ 396/76 |

FOREIGN PATENT DOCUMENTS

JP          8-334674          12/1996

\* cited by examiner

*Primary Examiner*—Russell Adams
*Assistant Examiner*—Arthur A Smith
(74) *Attorney, Agent, or Firm*—Morgan & Finnegan, LLP

(57) ABSTRACT

The invention provides an optical apparatus comprising an optical member constituting the optical apparatus, memory means for memorizing preset information, control means for selectively executing preset drive controls of plural kinds utilizing the preset information memorized in the memory means, in response to a memory instructing operation for the optical member, and memory instructing operation means to be used in common for the memory instruction operation for the preset drive controls of the plural kinds.

20 Claims, 14 Drawing Sheets

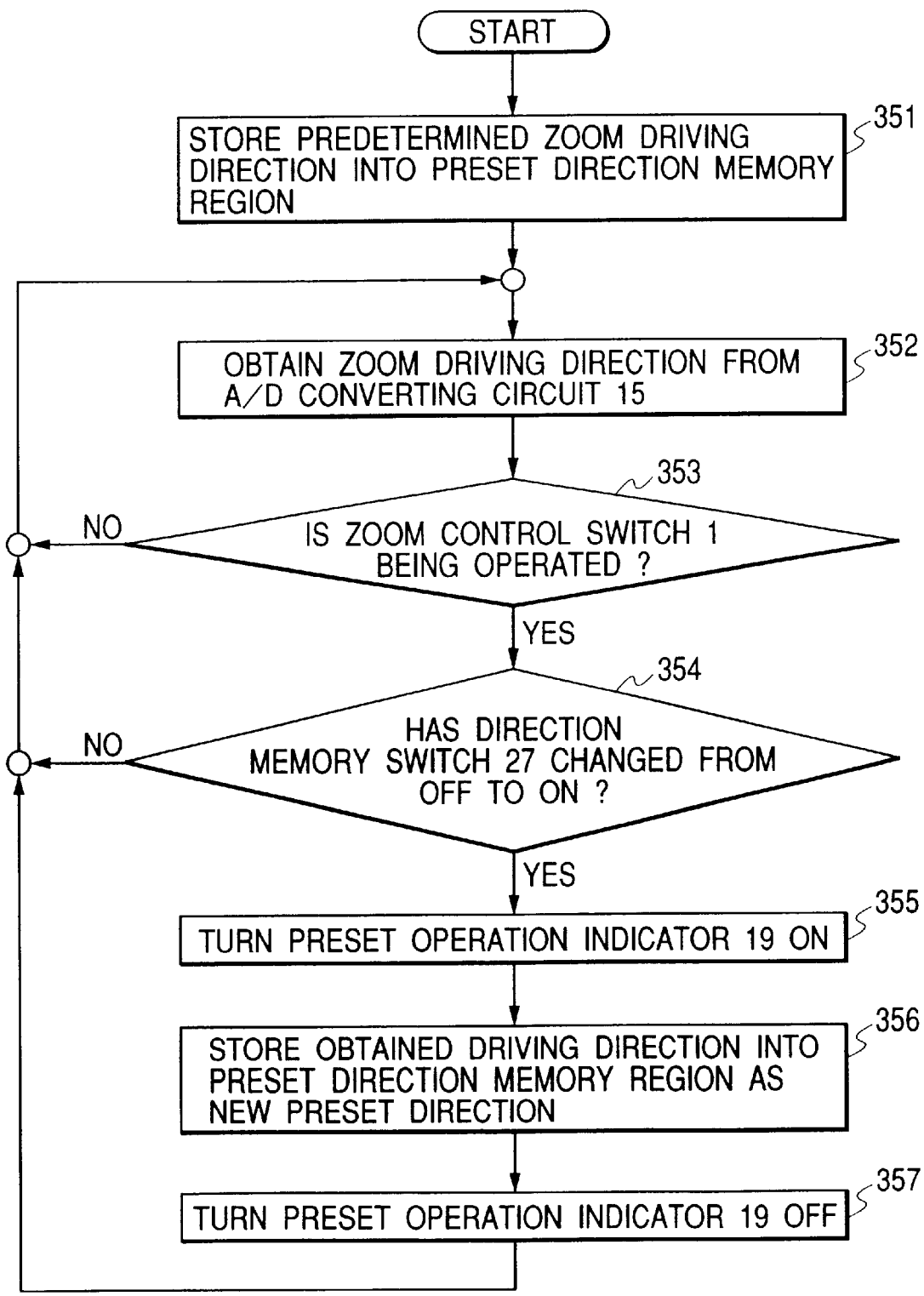

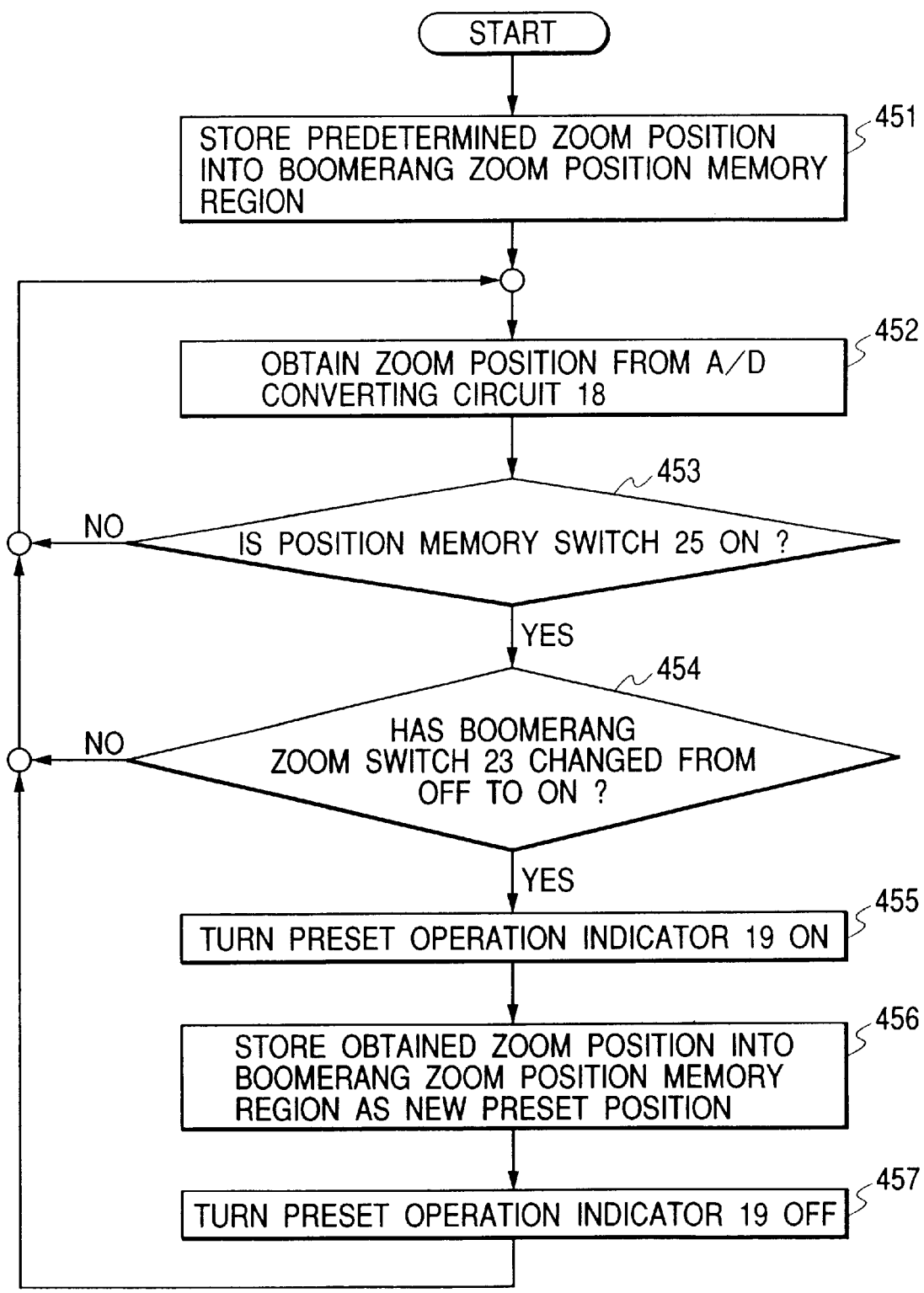

OPTICAL APPARATUS, OPTICAL APPARATUS DRIVING UNIT AND CAMERA SYSTEM

BACKGROUND OF THE INVENTION

1. Field of the Invention

The present invention relates to an optical apparatus and an optical apparatus driving unit adapted for use in a television camera, a video camera system or the like, and more particularly to a zoom lens apparatus adapted for use in an ENG camera system and a driving unit therefor.

2. Related Background Art

In the image taking operation with the television camera or the video camera, there are employed various image taking techniques and various functions are proposed for realizing such image taking techniques in a simpler and exact manner.

Firstly, there is known an imaging technique of moving the zoom lens to a predetermined zoom position at a high speed and starting the image taking operation from such zoom position. For such image taking technique, there is proposed a function of memorizing an arbitrary zoom position in advance as a preset position and moving the zoom lens to such preset position with a maximum available drive speed by turning on a switch in the course of the image taking operation. In the present specification, such function will be called "fast position preset zoom control".

Secondly, there is known an image taking technique of executing image taking while moving the zoom lens at a predetermined constant speed to a predetermined zoom ratio. For such image taking technique, there is proposed a method of in advance memorizing an arbitrary zoom position as a preset position and also memorizing an arbitrary drive speed of the zoom lens as a preset speed, and moving the zoom lens to such present position with such preset speed by turning on a switch in the course of the image taking operation. In the present specification, such function will be called "memory position preset zoom control".

Thirdly, there is known an image taking technique of executing image taking while moving the zoom lens at a predetermined low speed in a predetermined zooming direction. For such image taking technique, there is proposed a method of in advance memorizing an arbitrary driving direction of the zoom lens as a preset direction and also memorizing an arbitrary driving speed for the zoom lens as a preset speed, and moving the zoom lens in such preset direction with such preset speed, by turning on a switch in the course of the image taking operation. In the present specification, such function will be called "speed preset zoom control".

The first to third controls mentioned above are explained in detail in the Japanese Patent Application Laid-open Nos. 11-307143 and 11-307144.

Fourthly, there is known an image taking technique, in the course of image taking of an object with a certain zoom position, of changing the zoom position and subsequently returning the zoom lens to the original zoom position for continuing the image taking operation.

For such image taking technique, there is proposed a function of memorizing an arbitrary zoom position in advance as a preset position, then, in response to the turning-on of a switch, memorizing the current (original) zoom position and moving the zoom lens to the present position for enabling the image taking operation in such position, and, in response to the turning-off of the switch, driving the zoom lens to the original zoom position memorized when the switch is turned on, for enabling the image taking operation in such original zoom position. In the present specification, such function will be called "boomerang zoom control".

In executing so-called preset drive control functions, represented by such first to fourth controls, the present information such as the preset position, preset speed or present direction may be memorized for example by a variable resistor for each function or by the operation of memory instructing operation means which instructs the memory for example of a switch status in a semiconductor memory or the like.

A lens apparatus (optical apparatus) and a lens driving unit (optical apparatus driving unit) having the preset drive control functions of plural kinds are described in the Japanese Patent Application Laid-open Nos. 11-307143 and 11-307144, and, for each preset control function, there are provided the above-mentioned memory instructing operation means and control starting operation means such as a switch for selecting or starting each preset drive function.

However, in consideration of the recent strong requirement for multiple functions for the optical apparatus and for a smaller dimension and a lighter weight therefor, the use of independent memory instructing operation means for each of the preset drive control functions of plural kinds may complicate the memorizing operation for the preset information and may render it difficult to achieve such smaller dimension and lighter weight in the optical apparatus.

SUMMARY OF THE INVENTION

In order to resolve the aforementioned drawbacks, the present invention provides an optical apparatus provided with an optical member or an optical apparatus driving unit to be mounted on or connected to the main body of the optical apparatus, comprising:

memory means for memorizing preset information;

control means for selectively effecting preset drive controls of plural kinds utilizing the preset information memorized in the memory means, in response to a memory instructing operation for the optical member; and memory instructing operation means to be used for the memory instructing operation in common for the preset drive controls of the plural kinds.

In a preferred embodiment, the preset information of plural kinds are to be memorized in the memory means corresponding to the preset drive control of the plural kinds; and the memory instructing operation means is used in common for executing the memory instructing operations for the preset information of the plural kinds.

In a preferred embodiment, the control means executes the preset drive controls of plural kinds utilizing the preset information of a kind common to the preset drive controls of at least a part of the plural kinds; and the memory instructing operation means is used in common for executing the memory instructing operation for the preset information of the common kind for the preset drive controls of the plural kinds.

In a preferred embodiment, the memory instructing operation means consists of an on/off switch; and the control means causes the memory means to memorize the preset information in response to a turn-on operation of the memory instructing operation means.

In a preferred embodiment, there is provided control selecting operation means to be operated for selecting any of the preset drive controls of the plural kinds; and the control means cases the memory means to memorize the preset information to be used in the preset drive control selected by the operation of the control selecting operation means, in response to the operation of the control selecting operation means while the memory instructing operation means is operated or simultaneous with the operation thereof.

In a preferred embodiment, there is provided position detection means for detecting the actual drive position of the optical member and the preset drive controls of the plural kinds include a preset drive control to be executed utilizing preset position information; and the control means causes the memory means to memorize the actual drive position of the optical member, detected by the position detection means, as the preset position information, in response to the selection of the preset drive control utilizing the memorized preset position information by the operation of the control selecting operation means while the memory instructing operation means is operated or simultaneous with the operation thereof.

In a preferred embodiment, the control means is adapted to cause the memory means to memorize the preset information obtained from the actual drive state of the optical member, in response to the drive of the optical member and the operation of the memory instructing operation means.

In a preferred embodiment, there is provided drive instructing operation means to be operated for generating a drive command for the optical member corresponding to the operation amount and the operating direction; and the control means causes the memory means to memorize the preset information obtained from the actual drive state of the optical member, in response to the operation of the memory instructing operation means while the drive instructing operation means is operated or simultaneous with the operation thereof.

In a preferred embodiment, the control means causes the memory means to memorize the actual drive speed of the optical member as the preset information.

In a preferred embodiment, the control means causes the memory means to memorize the actual drive direction of the optical member as the preset information.

In a preferred embodiment, there is provided control selecting operation means to be operated for selecting any of the pre se t drive controls;

the control means selectively executes the preset drive controls of plural kinds utilizing the preset information of a same kind obtained from the actual drive state of the optical member or the drive command generated by the drive instructing operation means; and the control means causes the memory means to memorize the predetermined preset information to be utilized in the preset drive control selected by the operation of the control selecting operation means among the preset information of the same kind, in response to the operation of the memory instructing operation means.

In a preferred embodiment, the control means initiates the preset drive control in response to the selection of the preset drive control to be executed utilizing the memorized preset information, by the operation of the control selecting operation means to be operated for selecting any of the preset drive controls of the plural kinds after the memory of the preset information in the memory means.

In a preferred embodiment, there is provided drive instructing operation means to be operated for generating drive command for the optical member corresponding to the operation amount and the operating direction; and the control means causes the memory means to memorize the preset information obtained from the drive command generated by the drive instructing operation means, in response to the operation of the drive instructing operation means and the operation of the memory instructing operation means.

In a preferred embodiment, the control means causes the memory means to memorize the preset information obtained from the drive command generated by the drive instructing operation means, in response to the operation of the memory instructing operation means while the drive instructing operation means is operated or simultaneous with the operation thereof.

In a preferred embodiment, the control means causes the memory means to memorize the actual drive speed of the optical member as the preset information.

In a preferred embodiment, the control means causes the memory means to memorize the actual drive direction of the optical member as the preset information.

In a preferred embodiment, there is provided control selecting operation means to be operated for selecting any of the preset drive controls;

the control means selectively executes the preset drive controls of plural kinds utilizing the preset information of a same kind obtained from the actual drive state of the optical member or the drive command generated by the drive instructing operation means; and the control means causes the memory means to memorize the predetermined preset information to be utilized in the preset drive control selected by the operation of the control selecting operation means among the preset information of the same kind, in response to the operation of the memory instructing operation means.

In a preferred embodiment, the control means initiates the preset drive control in response to the selection of the preset drive control to be executed utilizing the memorized preset information, by the operation of the control selecting operation means to be operated for selecting any of the preset drive control of the plural kinds after the memory of the preset information in the memory means.

In a preferred embodiment, the control means initiates the preset drive control in response to the selection of the preset drive control to be executed utilizing the memorized preset information, by the repeated operation of the control selecting operation means after the memory of the preset information in the memory means.

In a preferred embodiment, there is provided display means for indicating that the preset information is memorized in the memory means.

In a preferred embodiment, an external control unit capable of an operation for causing the actual drive of the optical member is connected to a main body of the optical apparatus including the optical member; and the operation means are provided on the external control unit.

In a preferred embodiment, a camera system is composed of an optical apparatus, or an optical apparatus drive unit and a main body of the optical apparatus, according to any of the foregoing, and a camera on which the optical apparatus is to be mounted.

BRIEF DESCRIPTION OF THE DRAWINGS

FIG. 13 is a memory setting flow chart for a preset speed and a preset direction to be employed in the speed preset zoom control in the lens apparatus of the above-mentioned third embodiment; and FIG. 14 is a memory setting flow chart for a preset position to be employed in the boomerang zoom control in the above-mentioned lens apparatus.

DETAILED DESCRIPTION OF THE PREFERRED EMBODIMENTS

First Embodiment

Figure 1:
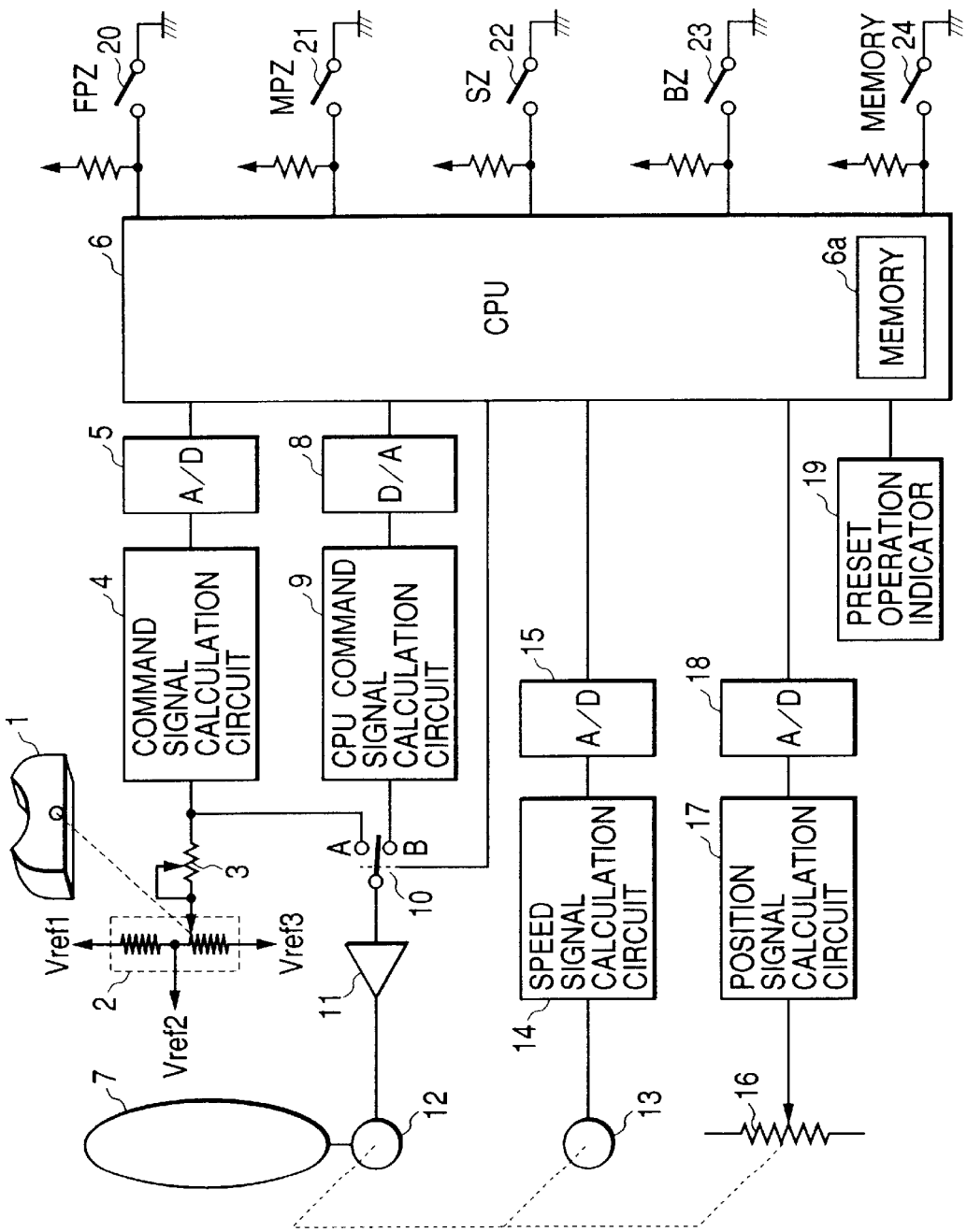
FIG. 1 is a view showing the configuration of a lens apparatus constituting a first embodiment of the present invention.

FIG. 1 shows the configuration of a lens apparatus (optical apparatus) constituting a first embodiment of the present invention. A zoom control switch (drive instructing operation means) 1 is to be operated by the photographer or operator. A command signal generation circuit 2 generates a command signal for instructing a drive direction and a drive speed (which may also be a drive amount or a drive position) proportionally corresponding to the operation amount of the zoom control switch 1 in order to electrically drive a zooming optical system (optical adjustment means) 7 for executing the zooming adjustment of the lens apparatus.

A zoom speed variable resistor 3 changes the drive speed of the zooming optical system 7 corresponding to the operation amount of the zoom control switch 1. A command signal calculation circuit 4 executes signal level shifting on the command signal for fetching in an A/D conversion circuit 5. An A/D conversion circuit 5 converts the analog signal outputted from the command signal calculation circuit 4 into a digital signal.

A CPU 6 controls the functions of the present lens apparatus and also executes the aforementioned four preset drive controls, namely "fast position preset zoom control", "memory position preset zoom control", "speed preset zoom control" and "boomerang zoom control". The CPU 6 is provided therein with a memory (memory means) 6a capable of memorizing preset information of three kinds, namely a preset position, a preset speed and a preset direction, to be utilized in such preset drive controls.

There are also provided a D/A converting circuit 8 for converting the digital command signal, outputted for driving the zooming optical system 7 into an analog signal; a CPU command signal calculation circuit 9 for shifting the signal level of the command signal outputted from the D/A converting circuit 8; and a command signal selector switch 10 for selecting whether the zooming optical system 7 is to be driven by the zoom control switch 1 or by the CPU 6.

There are also provided a power amplifier circuit 11 for activating a motor 12 for driving the zooming optical system 7; a speed detector 13 for outputting a speed signal corresponding to the drive speed of the zooming optical system 7; a speed signal calculation circuit 14 for shifting the signal level of the speed signal for fetching into an A/D conversion circuit 15; and an A/D conversion circuit 15 for converting the analog signal, outputted from the speed signal calculation circuit 14, into a digital signal.

There are also provided a position signal detector (position detection means) 16 for outputting a position signal corresponding to the position of the zooming optical system 7; a position signal calculation circuit 17 for shifting the signal level of the position signal for fetching into an A/D conversion circuit 18; and an A/D conversion circuit 18 for converting the analog signal, outputted from the position signal calculation circuit 17, into a digital signal.

A memory switch (memory instructing operation means) 24 is provided singly for the aforementioned preset drive controls of four kinds and is to be used in common for providing the CPU 6 with memory instructions for the preset information of three kinds, namely the preset position, preset speed and preset direction.

A fast position preset zoom (FPZ) switch 20 is provided for the "fast position preset zoom control" and is, as will be explained later, to be turned on after the memory switch 24 is turned on or simultaneous with the turn-on operation thereof for executing a memory function of causing the memory 6a to memorize the preset position to be employed in the above-mentioned control or to be turned on after the memory of the preset position for executing a function of instructing the start or end of such control operation.

A memory position preset zoom (MPZ) switch 21 is provided for the "memory position preset zoom control" and is, as will be explained later, to be turned on after the memory switch 24 is turned on or simultaneous with the turn-on operation thereof for executing a position memory function of causing the memory 6a to memorize the preset position to be employed in the above-mentioned control or to be turned on after the memory of the preset position for executing a function of instructing the start or end of such control operation.

A speed preset zoom (SZ) switch 22 is provided for the "speed preset zoom control" and is used for instructing the start or end of such control operation.

A boomerang zoom (BZ) switch 23 is provided for the "boomerang zoom control" and is, as will be explained later, to be turned on after the memory switch 24 is turned on or simultaneous with the turn-on operation thereof for executing a position memory function of causing the memory 6a to memorize the preset position to be employed in the above-mentioned control or for instructing the start or end of such control operation.

The fast position preset zoom switch 20, the memory position preset zoom switch 21, the speed preset zoom switch 22 and the boomerang zoom switch 23 correspond to the control selecting operation means referred to in the appended claims.

A preset operation indicator 19 provides visual indication whether the preset position, preset speed and/or preset direction is memorized in the memory 6a of the CPU 6.

The preset drive control switches 20 to 23 and the memory switch 24 may be provided integrally in the main body of the lens apparatus having the zooming optical system 7 and an unrepresented focusing optical system, or in a zoom demand (external control unit) which is connected to the main body of the lens apparatus for example through a cable and is provided for example with a thumb ring functioning in place for the zoom control switch 1.

Also the above-described components other than the zooming optical system 7, namely the zoom control switch 1, circuits such as the CPU 6, motor 12, speed detector 13, position detector 16, preset drive control switches 20 to 23 and memory switch 24, may be provided in a lens drive unit (optical apparatus driving unit) which is to be mounted on or connected to the main body of the lens apparatus of handy type.

In the lens apparatus or the lens drive unit of the above-described configuration, it is necessary to motor drive the zooming optical system 7 to the preset position as a preliminary operation for memorizing the preset position, or to motor drive in advance the zooming optical system 7 for memorizing the preset speed and the preset direction.

In the following there will at first be explained the drive control for the zooming optical system 7 from the zoom control switch 1. When the zoom control switch 1 is operated, the command signal generation circuit 2 generates a command signal for instructing the drive direction and the drive speed (which may also be drive amount or drive position), proportionally corresponding to the operation amount of the switch. The command signal is entered into the power amplifying circuit 11 through the zoom speed controlling variable resistor 3, which varies the drive speed of the zooming optical system 7 according to the operation amount of the zoom control switch 1, and the side A of the command signal selector switch 10, and is then entered into the motor 12 after amplification to a predetermined level by the power amplifying circuit 11, whereby the motor 12 is activated to drive the zooming optical system 7.

The position of the zooming optical system 7 required for memorizing the preset position can be detected by the entry of the output of the position detector 16 into the CPU 6 through the position signal calculation circuit 17 and the A/D conversion circuit 18.

Also the actual drive speed and the actual drive direction of the zooming optical system 7, required for memorizing the preset speed and the preset direction, can be detected by the entry of the output of the speed detector 13 into the CPU 6 through the speed signal calculation circuit 14 and the A/D conversion circuit 15.

Also the discrimination whether the zoom control switch 1 is operated, required in memorizing the preset speed and the preset direction as will be explained later, can be achieved by the entry of the command signal, outputted from the command signal generation circuit 2 corresponding to the operation amount of the zoom control switch 1, into the CPU 6 through the zoom speed controlling variable resistor 3, the command signal calculation circuit 4 and the A/D conversion circuit 5.

In the following there will be explained memory setting sequences for the various preset information, required in executing the aforementioned preset drive controls.

At first there will be explained the memory setting sequence for the preset position employed in the "fast position preset zoom control".

In this memory setting sequence, the operator in advance moves the zooming optical system 7 to a desired position to be preset and, in a state where the memory switch 24 is turned on, the CPU 6 memorizes, as the preset position, the position of the zooming optical system 7 (actual position detected through the position detector 16) when the fast position preset zoom switch 20 is shifted from the off-state to the on-state.

Figure 2:
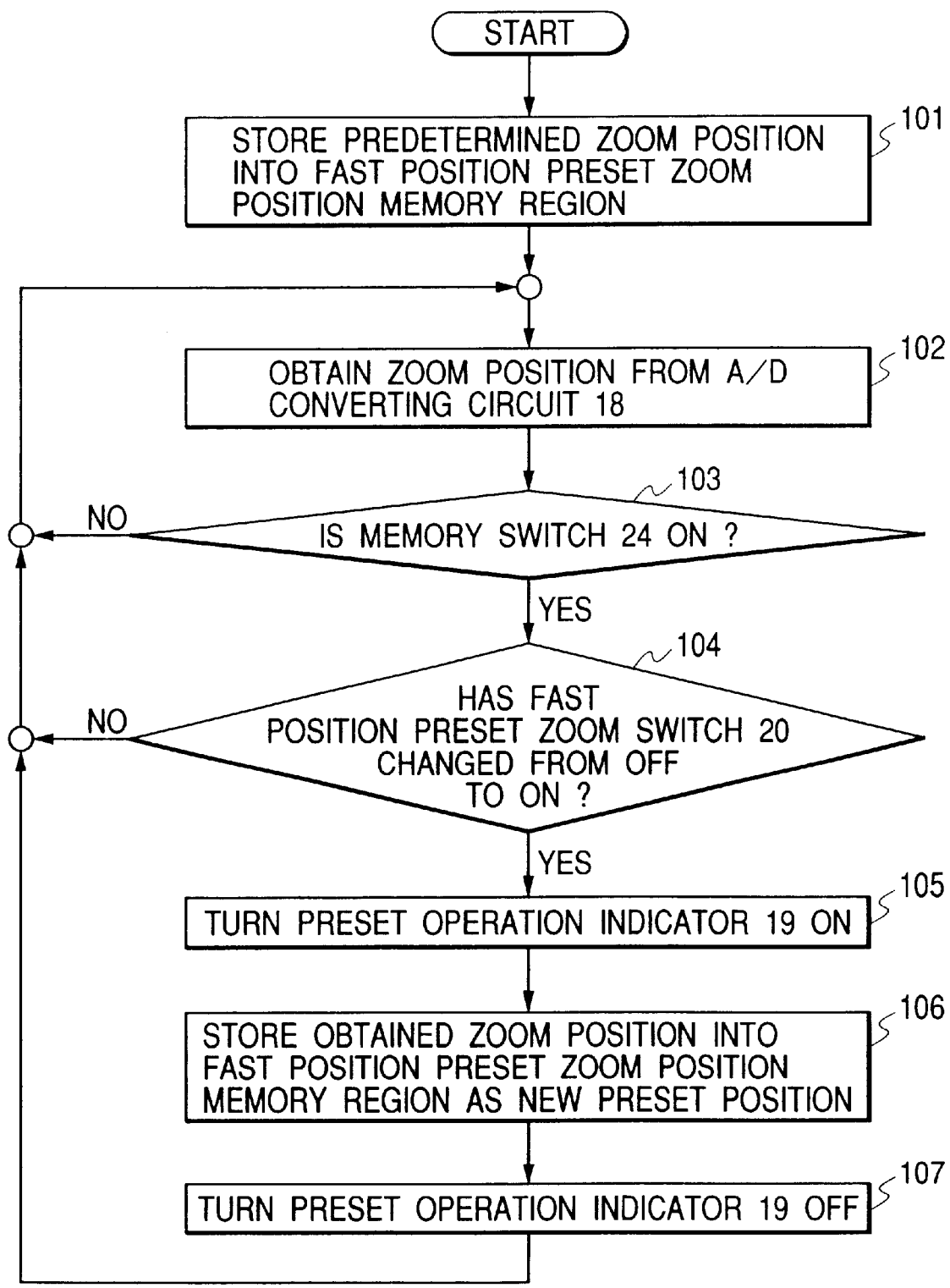
FIG. 2 is a memory setting flow chart for a preset position to be employed in the fast position preset zoom control in the above-mentioned lens apparatus.

The process of the CPU 6 in the above-described sequence will be explained with reference to FIG. 2. At first, as an initialization, a predetermined zoom position, such as the wide angle end, is memorized as a preset position in a fast position preset zoom memory area provided in the memory 6a (step 101). The preset position in such initialization may also be the position of the zooming optical system 7 when the power supply of the lens apparatus is turned on, or a position of the zooming optical system 7 desired by the operator, or a position of the zooming optical system 7 selected while the lens apparatus is powered previous time.

Then the position of the zooming optical system 7 is acquired from the A/D conversion circuit 18 (step 102). Then there is discriminated whether the memory switch 24 is turned on (step 103), and, if not turned on, the position of the zooming optical system 7 is acquired again from the A/D conversion circuit 18 (step 102).

If the memory switch 24 is turned on, there is discriminated whether the fast position preset zoom switch 20 has been shifted from the off-state to the on-state (step 104), and, if not shifted, the sequence returns to the step 102.

If the fast position preset zoom switch 20 has been shifted from the off-state to the on-state, the preset operation indicator 19 is turned on for indicating that the memory operation of the preset position is executed (step 105), and the position of the zooming optical system 7 acquired in the step 102 is memorized as a new preset position in the fast position preset zoom memory area (step 106). Thereafter the preset operation indicator 19 is turned off (step 107).

After the preset position is memorized in this manner and the image taking operation is started with the movement of the zooming optical system 7 by the operation of the zoom control switch 1, the zooming optical system 7 can be driven to the preset position at the maximum drive speed in response to the turn-on again of the fast position preset zoom switch 20.

In the following there will be explained the memory setting sequence for the preset position to be employed in the "memory position preset zoom control".

In this memory setting sequence, the operator in advance moves the zooming optical system 7 to a desired position to be preset and, in a state where the memory switch 24 is turned on, the CPU 6 memorizes, as the preset position, the position of the zooming optical system 7 (actual position detected through the position detector 16) when the memory position preset zoom switch 21 is shifted from the off-state to the on-state.

Figure 3:
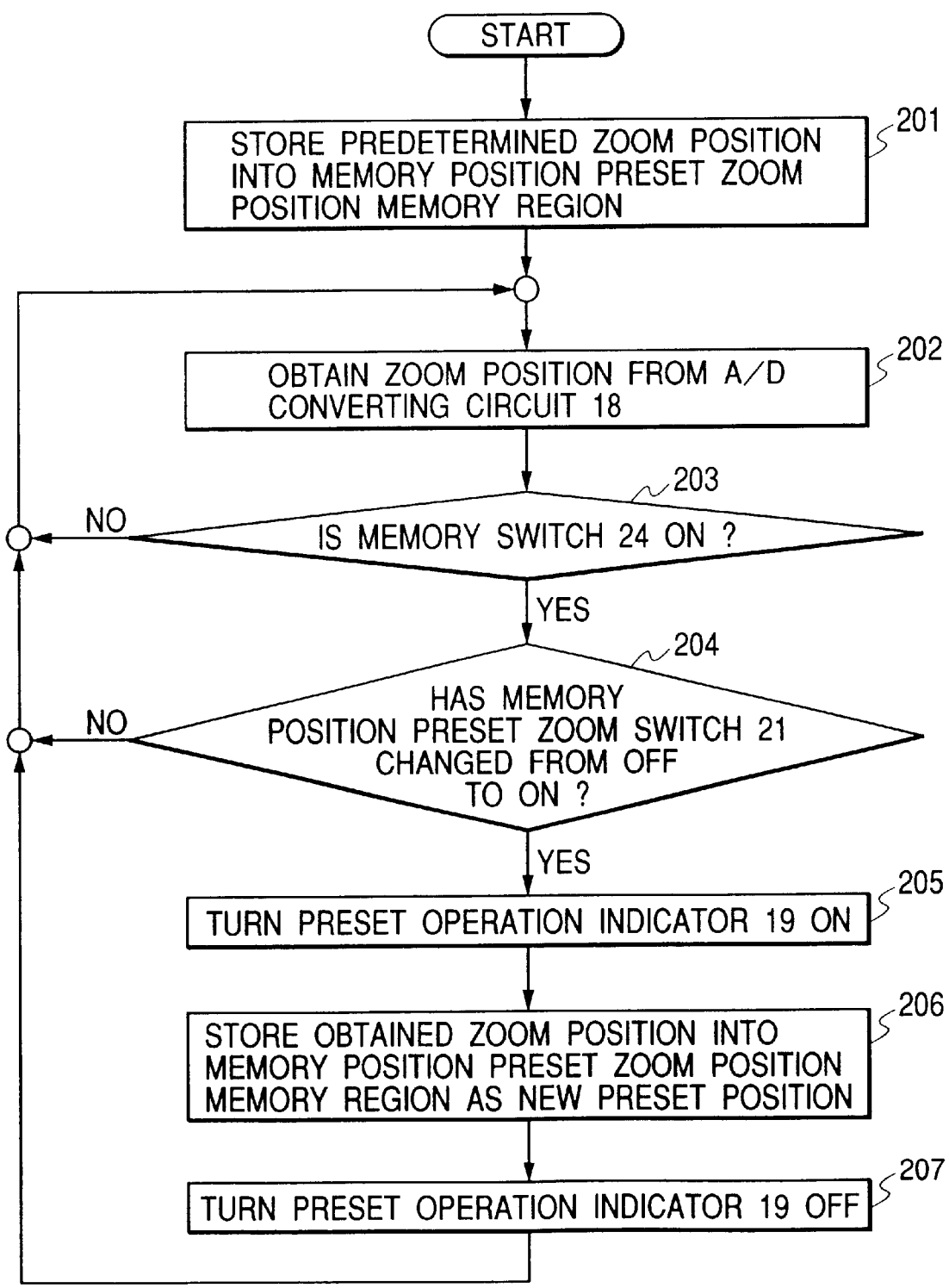
FIG. 3 is a memory setting flow chart for a preset position to be employed in the memory position preset zoom control in the above-mentioned lens apparatus.

The process of the CPU 6 in the above-described sequence will be explained with reference to FIG. 3. At first, as an initialization, a predetermined zoom position, such as the wide angle end, is memorized as a preset position in a memory position preset zoom position memory area provided in the memory 6a (step 201). The preset position in such initialization may also be the position of the zooming optical system 7 when the power supply of the lens apparatus is turned on, or a position of the zooming optical system 7 desired by the operator, or a position of the zooming optical system 7 selected while the lens apparatus is powered previous time.

Then the zoom position is acquired from the A/D conversion circuit 18 (step 202). Then there is discriminated whether the memory switch 24 is turned on (step 203), and, if not turned on, the position of the zooming optical system 7 is acquired again from the A/D conversion circuit 18 (step 202).

If the memory switch 24 is turned on, there is discriminated whether the memory position preset zoom switch 21 has been shifted from the off-state to the on-state (step 204), and, if not shifted, the sequence returns to the step 202.

If the memory position preset zoom switch 21 has been shifted from the off-state to the on-state, the preset operation indicator 19 is turned on for indicating that the memory operation of the preset position is executed (step 205), and the position of the zooming optical system 7 acquired in the step 202 is memorized as a new preset position in the memory position preset zoom position memory area (step 206). Thereafter the preset operation indicator 19 is turned off (step 207).

In the following there will be explained the memory setting sequence for the preset speed to be employed in the "memory position preset zoom control".

In this memory setting sequence, the operator operates the zoom control switch 1 to more in advance the zooming optical system 7 with a desired speed to be preset, and, in such state, the CPU 6 memorizes, as the preset speed, the drive speed of the zooming optical system 7 (actual drive speed detected through the speed detector 13) when the memory switch 24 is shifted from the off-state to the on-state.

Figure 4:
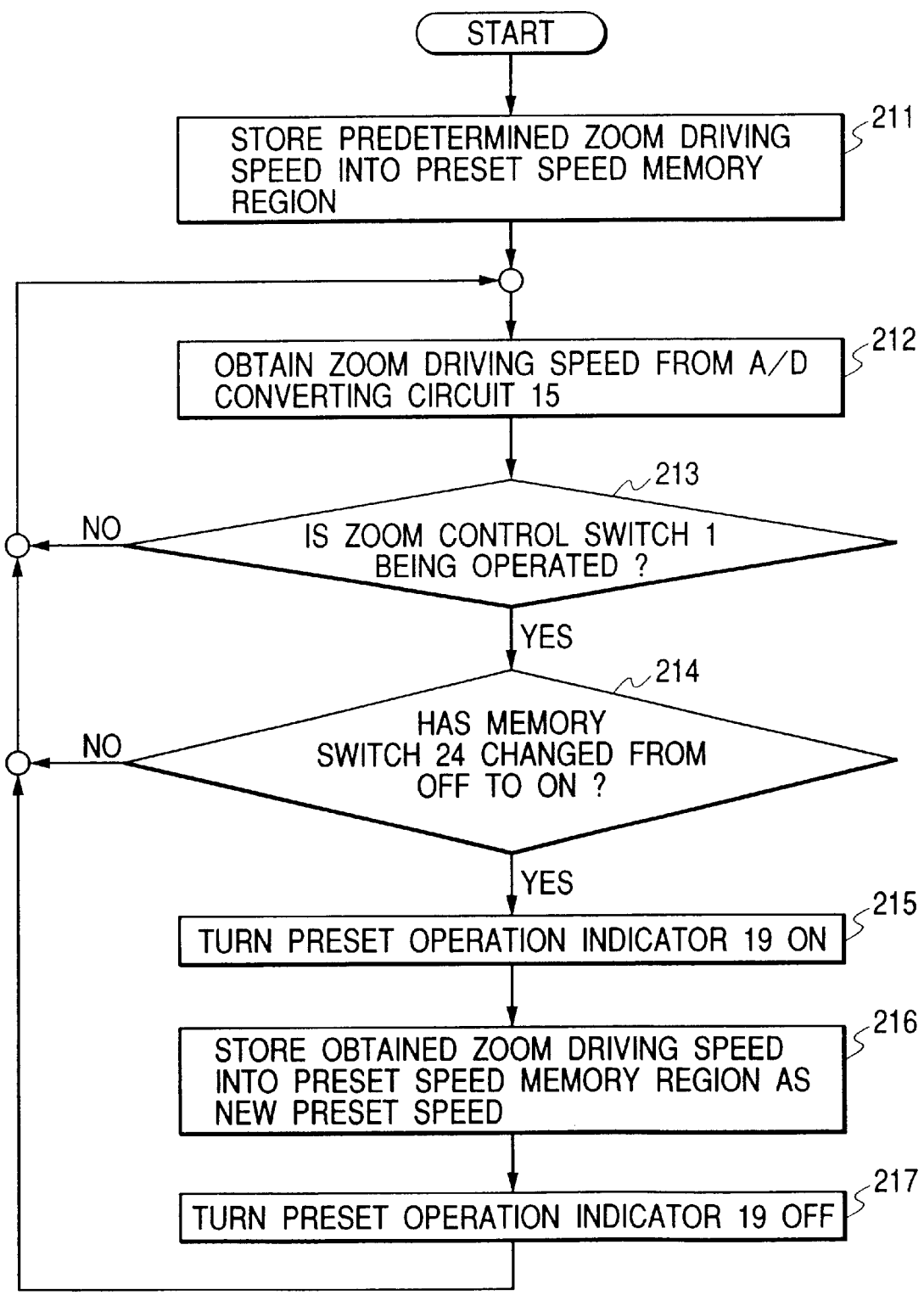
FIG. 4 is a memory setting flow chart for a preset speed to be employed in the memory position preset zoom control in the above-mentioned lens apparatus.

The process of the CPU 6 in the above-described sequence will be explained with reference to FIG. 4. At first, as an initialization, a predetermined zoom driving speed, such as the maximum speed, is memorized as a preset speed in a preset speed memory area provided in the memory 6a (step 211). The preset speed in such initialization may be the zoom driving speed desired by the operator, or a zoom driving speed selected while the lens apparatus is powered previous time.

Then the drive speed of the zooming optical system 7 is acquired from the A/D conversion circuit 15 (step 212). Then there is discriminated whether the zoom control switch 1 is operated by acquiring the data of the A/D conversion circuit 5 (step 213), and, if not operated, the zoom speed is acquired again from the A/D conversion circuit 15 (step 212).

If the zoom control switch 1 is operated, there is discriminated whether the memory switch 24 has been shifted from the off-state to the on-state (step 214), and, if not shifted, the sequence returns to the step 212.

If the memory switch 24 has been shifted from the off-state to the on-state, the preset operation indicator 19 is turned on for indicating that the memory operation of the preset speed is executed (step 215), and the speed of the zooming optical system 7 acquired in the step 212 is memorized as a new preset speed in the preset speed memory area (step 216). Thereafter the preset operation indicator 19 is turned off (step 217).

After the preset position and the preset speed are memorized in this manner and the image taking operation is started with the movement of the zooming optical system 7 by the operation of the zoom control switch 1, the zooming optical system 7 can be driven to the preset position at the preset speed in response to the turn-on again of the memory position preset zoom switch 21.

In the following there will be explained the memory setting sequence for the preset speed and the preset direction to be employed in the "speed preset zoom control".

In this memory setting sequence, the operator operates the zoom control switch 1 to move in advance the zooming optical system 7 with desired speed and direction to be preset, and, in such state, the CPU 6 memorizes the drive speed of the zooming optical system 7 (actual drive speed detected through the speed detector 13) as the preset speed and the drive direction of the zooming optical system 7 (actual drive direction detected from the output of the speed detector 13) as the preset direction, when the memory switch 24 is shifted from the off-state to the on-state.

Figure 5:
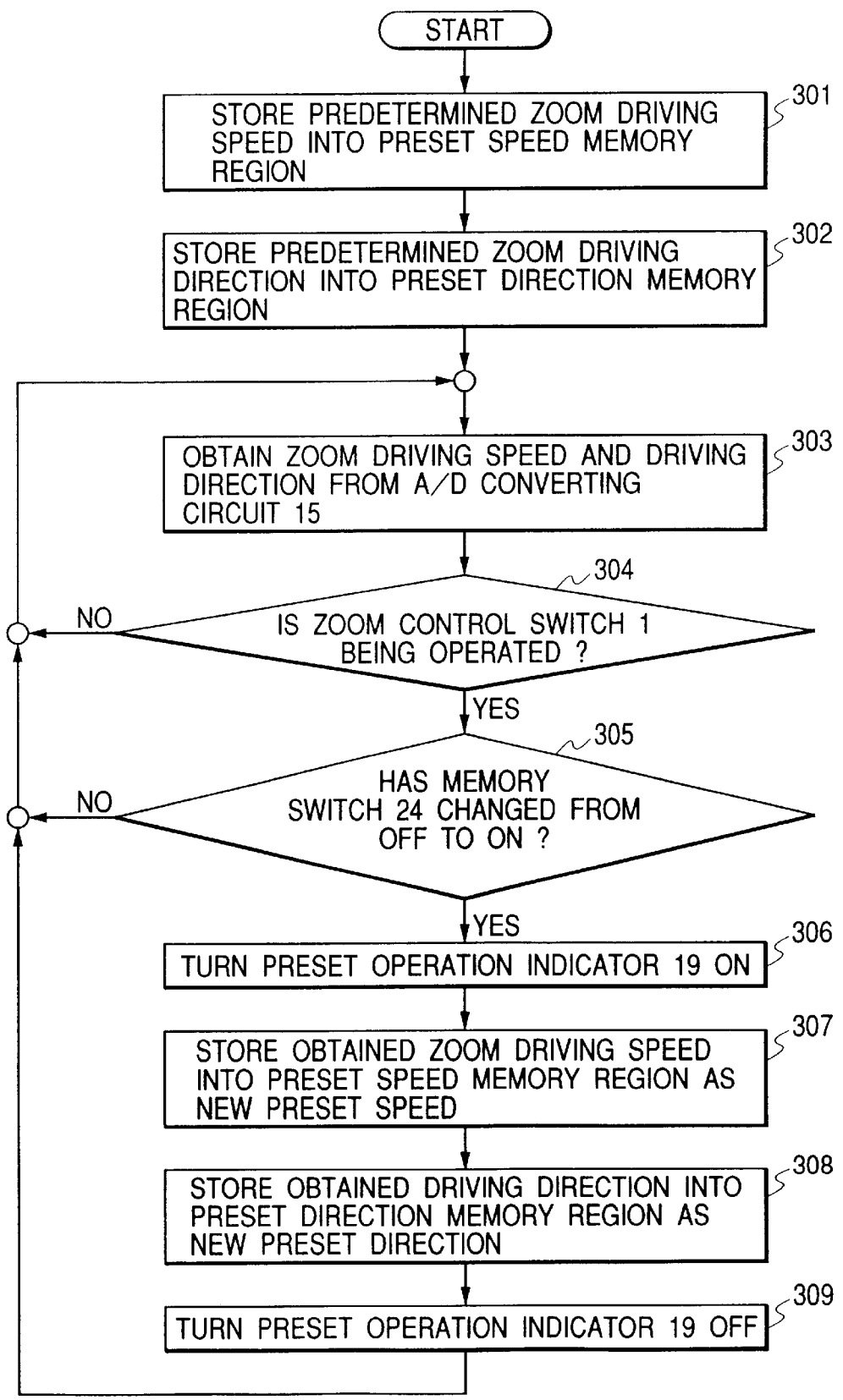
FIG. 5 is a memory setting flow chart for a preset speed and a preset direction to be employed in the speed preset zoom control in the above-mentioned lens apparatus.

The process of the CPU 6 in the above-described sequence will be explained with reference to FIG. 5. At first, as an initialization, a predetermined zooming speed, such as the maximum speed, is memorized as a preset speed in a preset speed memory area provided in the memory 6a (step 301). The preset speed in such initialization may be the zooming speed desired by the operator, a zooming speed selected while the lens apparatus is powered previous time.

Also as an initialization, a predetermined zooming direction, such as the telephoto side or the wide angle side, is memorized as the preset direction in a preset direction memory area provided in the memory 6a (step 302). The preset direction in such initialization may be the zooming direction desired by the operator or a zooming direction selected while the lens apparatus is powered previous time.

Then the drive speed and the drive direction of the zooming optical system 7 are acquired from the A/D conversion circuit 15 (step 303). Then there is discriminated whether the zoom control switch 1 is operated by acquiring the data of the A/D conversion circuit 5 (step 304), and, if not operated, the zooming speed and the zooming direction are acquired again from the A/D conversion circuit 15 (step 303).

If the zoom control switch 1 is operated, there is discriminated whether the memory switch 24 has been shifted from the off-state to the on-state (step 305), and, if not shifted, the sequence returns to the step 303.

If the memory switch 24 has been shifted from the off-state to the on-state, the preset operation indicator 19 is turned on for indicating that the memory operation of the preset speed and the preset direction is executed (step 306), and the zooming speed acquired in the step 303 is memorized as a new preset speed in the preset speed memory area (step 307). Also the zooming direction acquired in the step 303 is memorized as a new preset direction in the preset direction memory area (step 308). Thereafter the preset operation indicator 19 is turned off (step 309).

After the preset speed and the preset direction are memorized in this manner and the image taking operation is started, the zooming optical system 7 can be driven with the preset speed in the preset direction, in response to the turn-on of the speed preset zoom switch 22.

In the following there will be explained the memory setting sequence for the preset position to be employed in the "boomerang zoom control".

In this memory setting sequence, the operator in advance moves the zooming optical system 7 to a desired position to be preset, and, in a state where the memory switch 24 is turned on, the CPU 6 memorizes, as the preset position, the position of the zooming optical system 7 (actual drive position detected through the position detector 16) when the boomerang zoom switch 23 is shifted from the off-state to the on-state.

Figure 6:
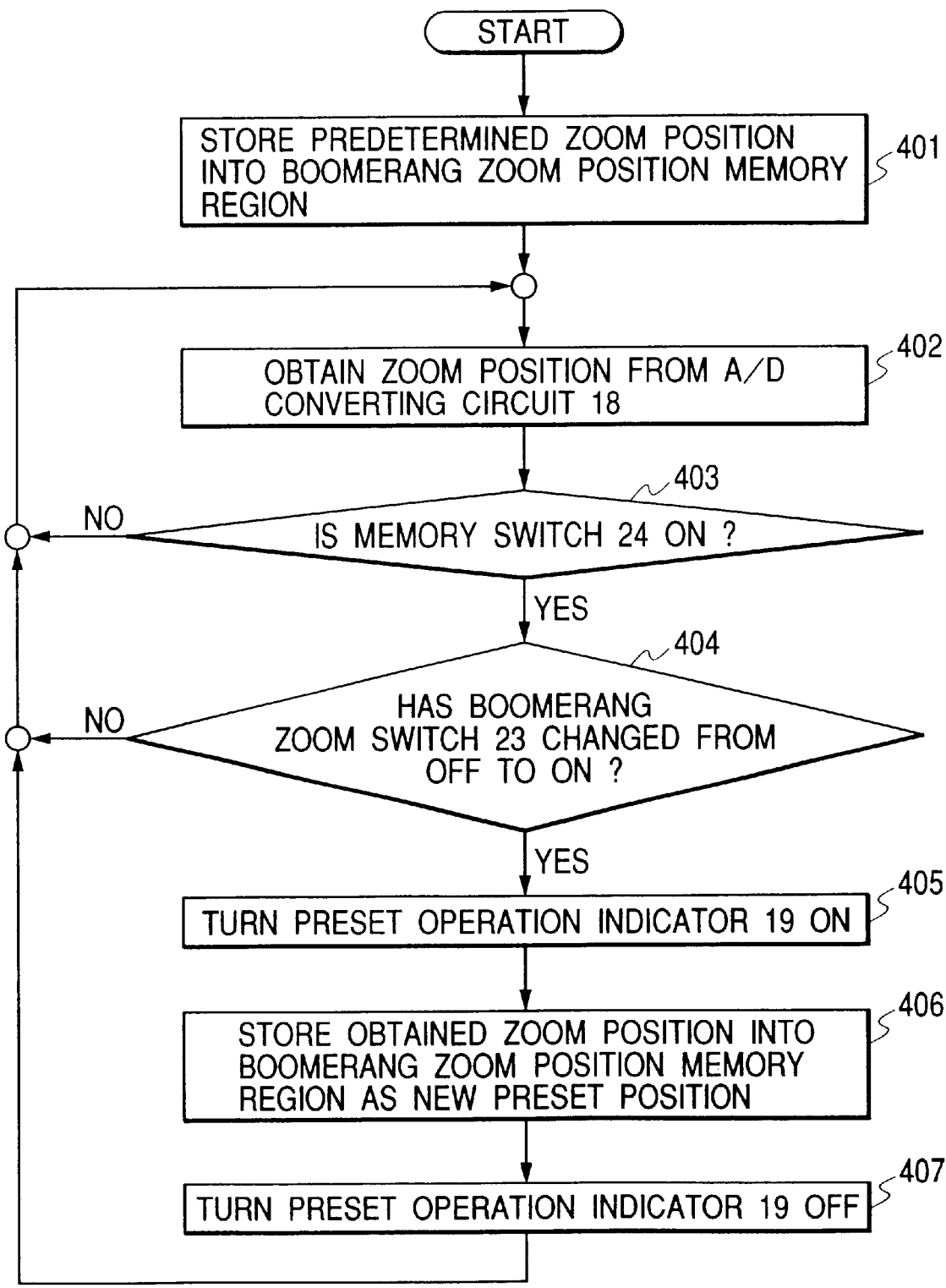
FIG. 6 is a memory setting flow chart for a preset position to be employed in the boomerang zoom control in the above-mentioned lens apparatus.

The process of the CPU 6 in the above-described sequence will be explained with reference to FIG. 6. At first, as an initialization, a predetermined zoom position, such as the wide angle end, is memorized as a preset position in a boomerang zoom position memory area provided in the memory 6a (step 401). The preset position in such initialization may be the position of the zooming optical system 7 when the power supply of the lens apparatus is turned on, or the position of the zooming optical system 7 desired by the operator, or a position of the zooming optical system 7 selected in the course of power supply of the lens apparatus previous time.

Then the position of the zooming optical system 7 is acquired from the A/D conversion circuit 18 (step 402). Then there is discriminated whether the memory switch 24 is turned on (step 403), and, if not turned on, the position of the zooming optical system 7 is acquired again from the A/D conversion circuit 18 (step 402).

If the memory switch 24 is operated, there is discriminated whether the boomerang zoom switch 23 has been shifted from the off-state to the on-state (step 404), and, if not shifted, the sequence returns to the step 402.

If the boomerang zoom switch 23 has been shifted from the off-state to the on-state, the preset operation indicator 19 is turned on to indicate that the memory of the preset position is executed (step 405) and the position of the zooming optical system 7 acquired in the step 402 is memorized as a new preset position in the boomerang zoom position memory area (step 406). Thereafter the preset operation indicator 19 is turned off (step 407).

After the preset position is memorized in this manner and the image taking operation is initiated with the movement of the zooming optical system 7 by the operation of the zoom control switch 1, in response to the turn-on again of the boomerang zoom switch 23, the position of the zooming optical system 7 detected through the position detector 16 is memorized in the memory 6a at the timing of such turn-on and the zooming optical system 7 is driven to the preset position with the maximum driving speed. Then, in response to the turn-off of the boomerang zoom switch 23 after the image taking operation in the foregoing state, the zooming optical system 7 returns with the maximum driving speed to the original position memorized when the boomerang zoom switch 23 is turned on to enable the image taking operation in such original position.

In the present embodiment, as explained in the foregoing, in executing any of the four preset drive controls, the preset information required for each preset drive control can be memorized in the memory 6a regardless of its kind (preset position, preset speed and/or preset direction) by turning on the same memory switch 24. Consequently, in comparison with the conventional configuration in which the memory instructing operation means is provided for each preset drive control, it is rendered possible to improve the operability and to reduce the dimension and weight of the lens apparatus or lens drive unit.

Second Embodiment

In the foregoing first embodiment, there has been explained a case where the zooming optical system 1 is driven with a desired speed to be preset by the operation of the zoom control switch 1 and, in such state, the CPU 6 memorizes, as the preset speed, the drive speed of the zooming optical system 7 when the memory switch 24 is shifted from the off-state to the on-state. In such procedure, it is not possible to judge at the memory of the preset speed whether such preset speed is to be used in the "memory position preset zoom control" and the "speed preset zoom control" to be executed with the preset speed. For this reason, in the first embodiment, the preset speed is memorized in common for the above-mentioned two preset drive controls.

Therefore, the present embodiment employs a memory setting sequence in consideration of a case of setting different preset speeds for the "memory position preset zoom control" and for the "speed preset zoom control". The configuration of the lens apparatus or the drive unit of the present embodiment is same as that in the first embodiment, and the components equivalent to those in the first embodiment are represented by symbols same as therein.

At first there will be explained the memory setting sequence for the preset speed employed in the "memory position preset zoom control".

In this memory setting sequence, in a state where the operator operates the zoom control switch 1 to drive the zooming optical system 7 with a desired speed to be preset (for example maximum speed) and the memory position preset zoom switch 21 is turned on, the CPU 6 memorizes, as the preset speed, the speed of the zooming optical system 7 when the memory switch 24 is shifted from the off-state to the on-state.

Figure 7:
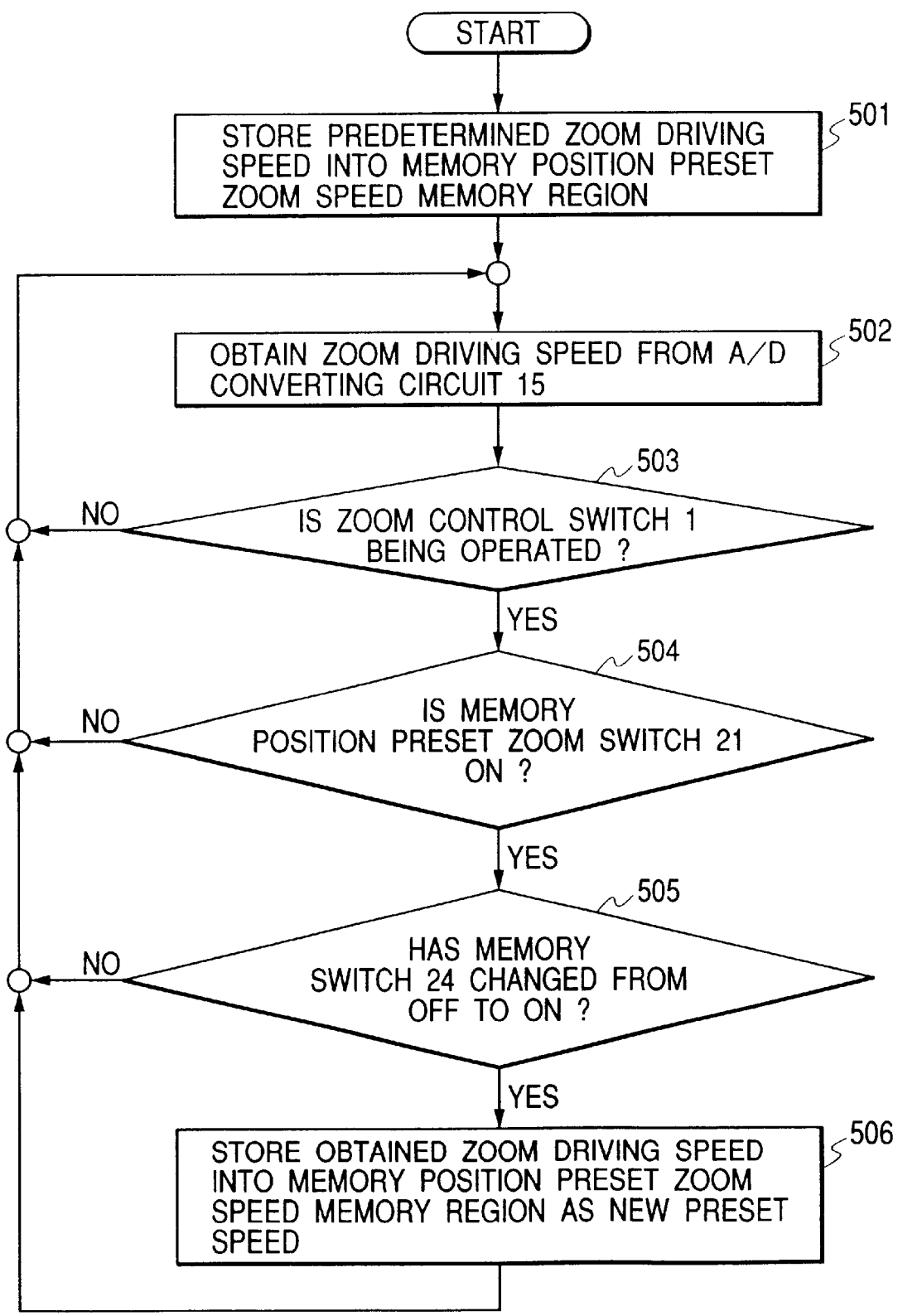
FIG. 7 is a memory setting flow chart for a preset speed to be employed in the memory position preset zoom control in a lens apparatus constituting a second embodiment of the present invention.

The process of the CPU 6 in the above-described sequence will be explained with reference to FIG. 7. At first, as an initialization, a drive speed of the zooming optical system 7, such as the maximum speed, is memorized as a preset speed in a memory position preset zoom speed memory area provided in the memory 6a (step 501). The preset speed in such initialization may be the speed of the zooming optical system 7 desired by the operator, or a speed of the zooming optical system 7 selected while the lens apparatus is powered previous time.

Then the speed of the zooming optical system 7 is acquired from the A/D conversion circuit 15 (step 502). Then there is discriminated whether the zoom control switch 1 is operated by acquiring the data of the A/D conversion circuit 5 (step 503), and, if not operated, the drive speed of the zooming optical system 7 is acquired again from the A/D conversion circuit 5 (step 502).

If the zoom control switch 1 is operated, there is discriminated whether the preset zoom switch 21 is turned on (step 504), and, if not turned on, the sequence returns to the step 502.

If the memory position preset zoom switch 21 is turned on, there is discriminated whether the memory switch 24 has been shifted from the off-state to the on-state (step 505), and, if not shifted, the sequence returns to the step 502.

If the memory switch 24 has been shifted from the off-state to the on-state, the drive speed of the zooming optical system 7 acquired in the step 502 is memorized as a new preset speed in the memory position preset zoom speed memory area (step 506).

In the foregoing there has been explained a configuration in which, in a state where the zooming optical system 7 is driven with the speed to be preset by the operation of the zoom control switch 1 and the memory position preset zoom switch 21 is turned on, the CPU 6 memorizes, as the preset speed, the drive speed of the zooming optical system 7 when the memory switch 24 is shifted from the off-state to the on-state. It is however possible also to adopt a configuration in which, in a state where the zooming optical system 7 is driven with the speed to be preset by the operation of the zoom control switch 1 and the memory switch 24 is turned on, the CPU 6 memorizes, as the preset speed, the drive speed of the zooming optical system 7 when the memory position preset zoom switch 21 is shifted from the off-state to the on-state.

Also it is possible to memorize the preset speed when the memory switch 24 and the memory position preset zoom switch 21 are simultaneously turned on.

It is also possible to turn on and off the preset operation indicator 19 as in the first embodiment.

In the following there will be explained the memory setting sequence for the preset speed to be employed in the "speed preset zoom control". The memory setting sequence for the preset direction is same as that in the first embodiment.

In this memory setting sequence, in a state where the operator operates the zoom control switch 1 to drive the zooming optical system 7 with a desired speed to be preset and the speed preset zoom switch 22 is turned on, the CPU 6 memorizes, as the preset speed, the speed of the zooming optical system 7 when the memory switch 24 is shifted from the off-state to the on-state.

Figure 8:
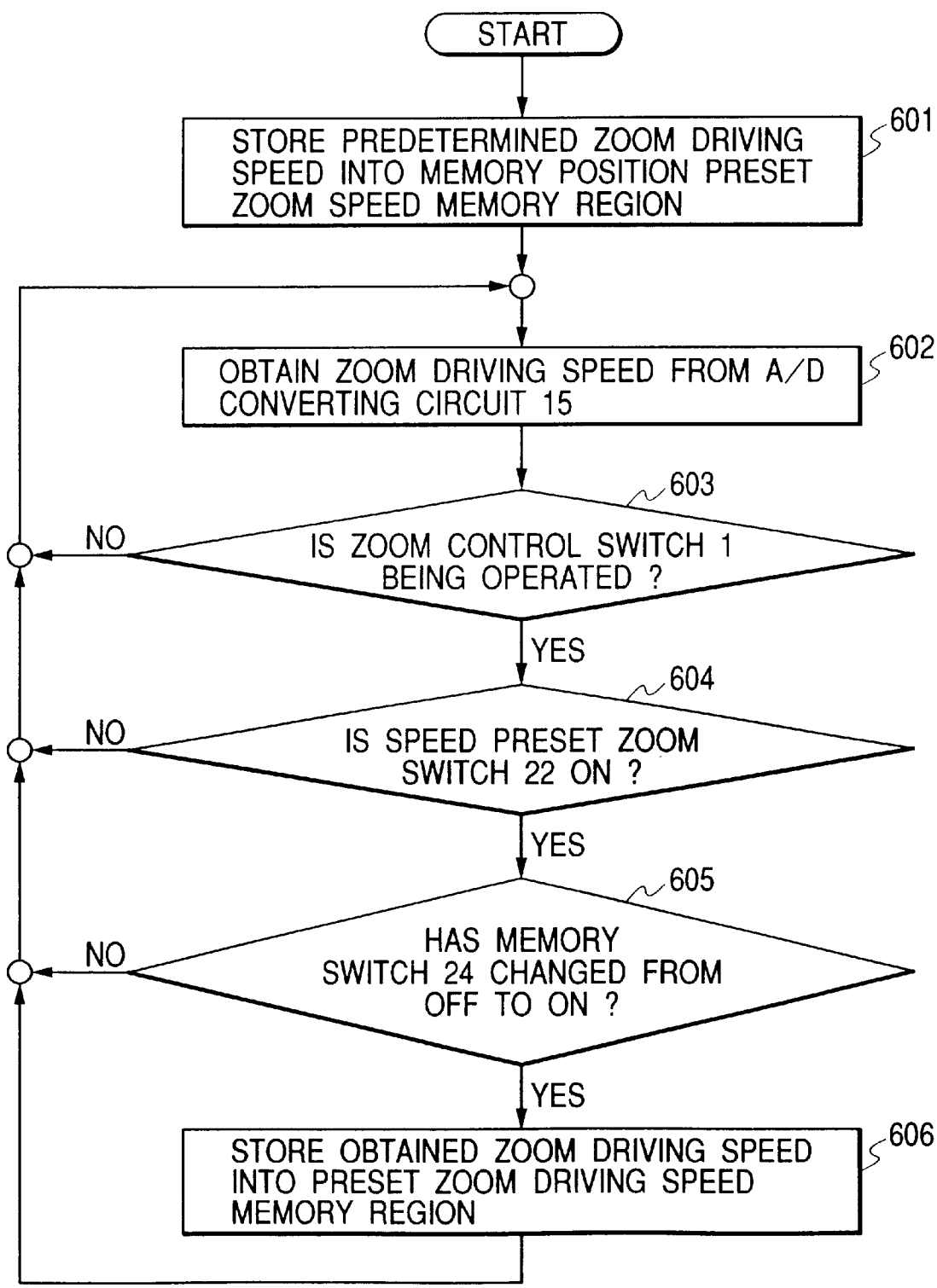
FIG. 8 is a memory setting flow chart for a preset speed to be employed in the speed preset zoom control in the above-mentioned second embodiment.

The process of the CPU 6 in the above-described sequence will be explained with reference to FIG. 8. At first, as an initialization, a drive speed of the zooming optical system 7, such as the minimum speed, is memorized as a preset speed in a speed preset zoom speed memory area provided in the memory 6a (step 601). The preset speed in such initialization may be the speed of the zooming optical system 7 desired by the operator, or a speed of the zooming optical system 7 selected while the lens apparatus is powered previous time.

Then the speed of the zooming optical system 7 is acquired from the A/D conversion circuit 15 (step 602). Then there is discriminated whether the zoom control switch 1 is operated by acquiring the data of the A/D conversion circuit 5 (step 603), and, if not operated, the zooming speed of the zooming optical system 7 is acquired again from the A/D conversion circuit 5 (step 602).

If the zoom control switch 1 is operated, there is discriminated whether the preset speed zoom switch 22 is turned on (step 604), and, if not turned on, the sequence returns to the step 602.

If the speed preset zoom switch 22 is turned on, there is discriminated whether the memory switch 24 has been shifted from the off-state to the on-state (step 605), and, if not shifted, the sequence returns to the step 602.

If the memory switch 24 has been shifted from the off-state to the on-state, the drive speed of the zooming optical system 7 acquired in the step 602 is memorized as a new preset speed in the speed preset zoom speed memory area (step 606).

In the foregoing there has been explained a configuration in which, in a state where the zooming optical system 7 is driven with the speed to be preset by the operation of the zoom control switch 1 and the speed preset zoom switch 22 is turned on, the CPU 6 memorizes, as the preset speed, the drive speed of the zooming optical system 7 when the memory switch 24 is shifted from the off-state to the on-state. It is however possible also to adopt a configuration in which, in a state where the zooming optical system 7 is driven with the speed to be preset by the operation of the zoom control switch 1 and the memory switch 24 is turned on, the CPU 6 memorizes, as the preset speed, the drive speed of the zooming optical system 7 when the speed preset zoom switch 22 is shifted from the off-state to the on-state.

Also it is possible to memorize the preset speed when the memory switch 24 and the speed preset zoom switch 22 are simultaneously turned on.

It is also possible to turn on and off the preset operation indicator 19 as in the first embodiment.

In the present embodiment, as explained in the foregoing, it is possible to memorize the preset speeds respectively corresponding to the "memory position preset zoom control" and the "speed preset zoom control" which are executed with the preset information of a same kind, namely the preset speed. Consequently, in comparison with the conventional case in which a same preset speed is memorized for the "memory position preset zoom control" and the "speed preset zoom control", it is rendered possible to widen the range of the image taking techniques and to realize the preset drive control function in a more effective manner.

Third Embodiment

In the foregoing first and second embodiments, there has been explained a case where a memory switch 24 is used in common for the memory instructing operation of the preset information of three kinds, namely the preset position, preset speed and preset direction, but it is also possible to use different memory switches for the preset information of different kinds. Stated differently, each memory switch may be used in common only for the preset information of a same kind.

Figure 9:
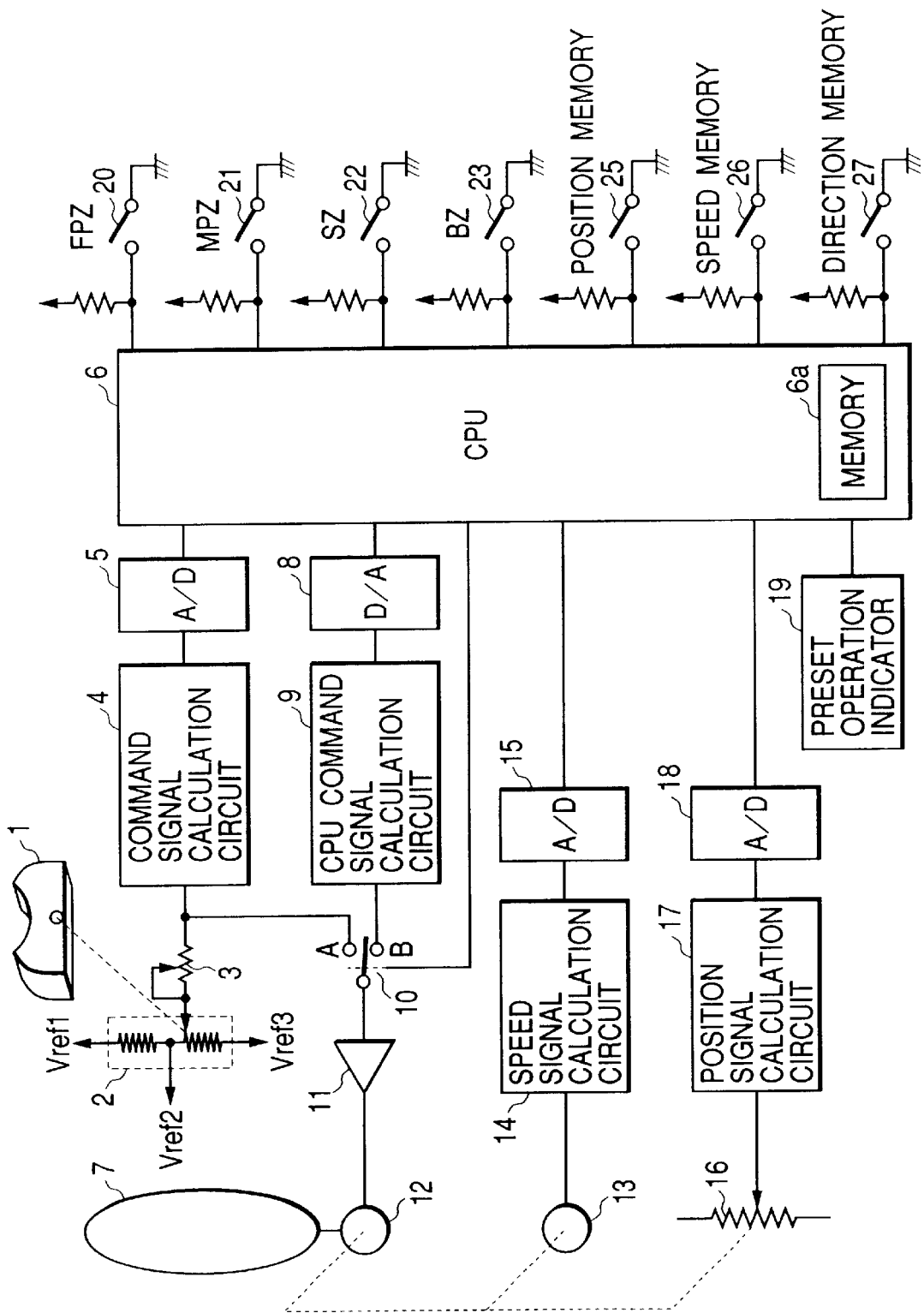
FIG. 9 is a view showing the configuration of a lens apparatus constituting a third embodiment of the present invention.

FIG. 9 shows the configuration of the lens apparatus or the drive unit constituting a third embodiment of the present embodiment, wherein components equivalent to those in the first embodiment are represented by symbols same as therein. Also in the present embodiment, there can be executed the preset drive controls of the aforementioned four kinds, namely the "fast position preset zoom control", "memory position preset zoom control", "speed preset zoom control" and "boomerang zoom control".

Referring to FIG. 9, a position memory switch (memory instructing operation means) 25 is provided in a single unit for the "fast position preset zoom control", the "memory position preset zoom control" and the "boomerang zoom control" to be executed utilizing the preset position, among the aforementioned four preset drive controls, and is used in common for instructing the CPU 6 to memorize the preset position for these controls.

Also a speed memory switch (memory instructing operation means) 26 is provided in a single unit for the "memory position preset zoom control" and the "speed preset zoom control" to be executed utilizing the preset speed, among the aforementioned four preset drive controls, and is used in common for instructing the CPU 6 to memorize the preset speed for these controls.

Also a direction memory switch (memory instructing operation means) 26 is provided for the "speed preset zoom control" to be executed utilizing the preset direction, among the aforementioned four preset drive controls, and is used in common for instructing the CPU 6 to memorize the preset direction.

The preset drive control switches 20 to 23 and the memory switches 25 to 27 may be provided integrally in the main body of the lens apparatus having the zooming optical system 7 and an unrepresented focusing optical system, or in a zoom demand (external control unit) which is connected to the main body of the lens apparatus for example through a cable and is provided for example with a thumb ring functioning in place for the zoom control switch 1.

Also the above-described components other than the zooming optical system 7, namely the zoom control switch 1, circuits such as the CPU 6, motor 12, speed detector 13, position detector 16, preset drive control switches 20 to 23 and memory switches 25 to 27, may be provided in a lens drive unit (optical apparatus driving unit) which is to be mounted on or connected to the main body of the lens apparatus of handy type.

In the lens apparatus or the lens drive unit of the above-described configuration, it is necessary to motor drive the zooming optical system 7 to the preset position as a preliminary operation for memorizing the preset position, or to motor drive in advance the zooming optical system 7 for memorizing the preset speed and the preset direction, as in the foregoing first embodiment. Also the drive control method for the zooming optical system 7 from the zoom control switch 1, the method of detecting the position of the zooming optical system 7 required in memorizing the preset position and the method of detecting the drive speed and the driving direction of the zooming optical system 7 required in memorizing the preset speed and the preset direction are same as those in the first embodiment.

In the following there will be explained the memory setting sequences for the various preset information, required in executing the preset drive controls mentioned above.

At first there will be explained the memory setting sequence for the preset position employed in the "fast position preset zoom control".

In this memory setting sequence, the operator in advance moves the zooming optical system 7 to a desired position to be preset and, in a state where the position memory switch 25 is thereafter turned on, the CPU 6 memorizes, as the preset position, the position of the zooming optical system 7 (actual position detected through the position detector 16) when the fast position preset zoom switch 20 is shifted from the off-state to the on-state.

Figure 10:
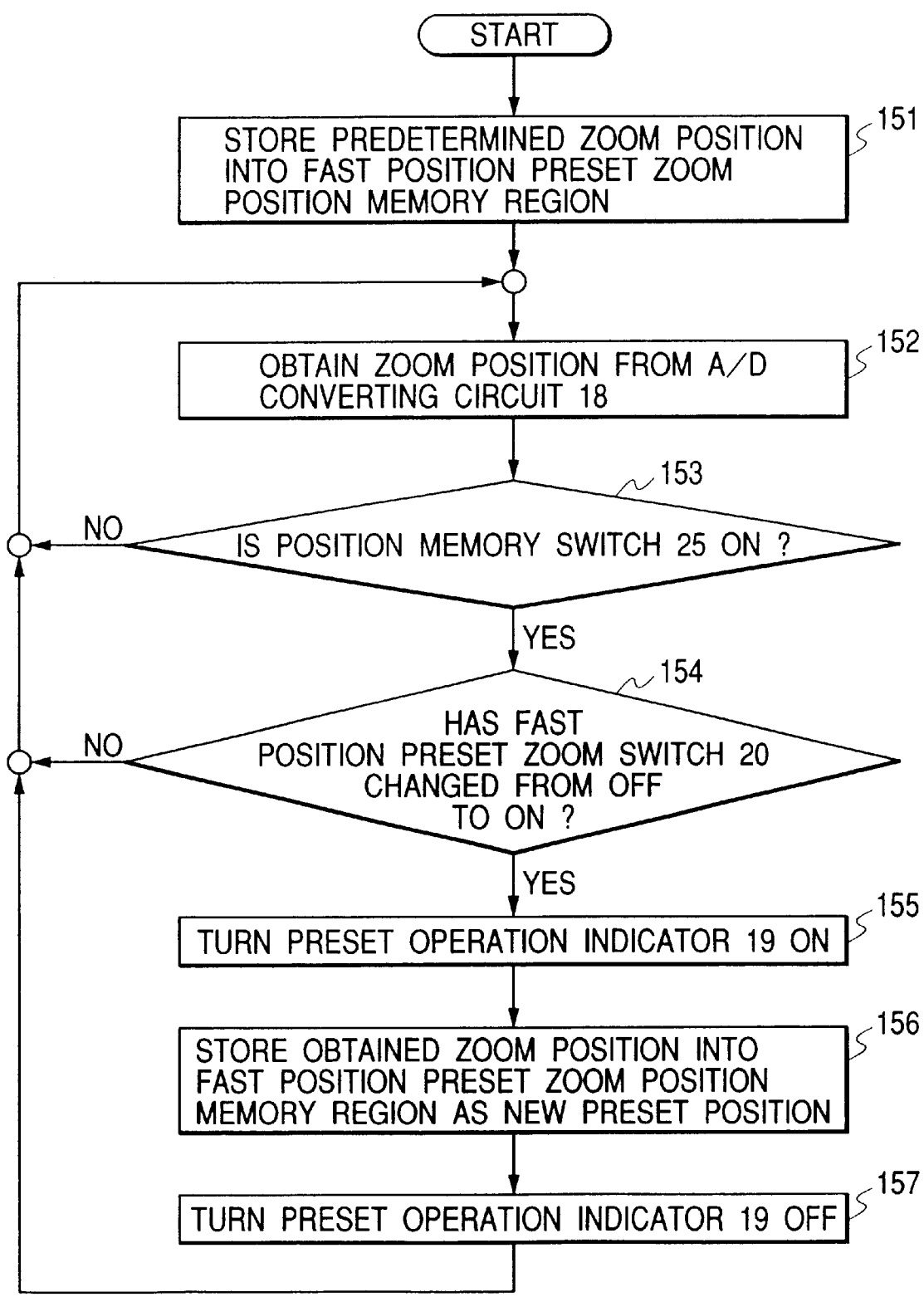
FIG. 10 is a memory setting flow chart for a preset position to be employed in the fast position preset zoom control in the lens apparatus of the above-mentioned third embodiment.

The process of the CPU 6 in the above-described sequence will be explained with reference to FIG. 10. At first, as an initialization, a predetermined zoom position, such as the wide angle end, is memorized as the preset position in the fast position preset zoom position memory area provided in the memory 6a (step 151). The preset position in such initialization may be the position of the zooming optical system 7 when the power supply of the lens apparatus is turned on, or a position of the zooming optical system 7 desired by the operator, or a position of the zooming optical system 7 selected while the lens apparatus is powered previous time.

Then the position of the zooming optical system 7 is acquired from the A/D conversion circuit 18 (step 152). Then there is discriminated whether the position memory switch 25 is turned on (step 153), and, if not turned on, the position of the zooming optical system 7 is acquired again from the A/D conversion circuit 18 (step 152).

If the position memory switch 25 is turned on, there is discriminated whether the fast position preset zoom switch 20 has been shifted from the off-state to the on-state (step 154), and, if not shifted, the sequence returns to the step 152.

If the fast position preset zoom switch 20 has been shifted from the off-state to the on-state, the preset operation indicator 19 is turned on for indicating that the memory operation of the preset position is executed (step 155), and the position of the zooming optical system 7 acquired in the step 152 is memorized as a new preset position in the fast position preset zoom position memory area (step 156). Thereafter the preset operation indicator 19 is turned off (step 157).

After the preset position is memorized in this manner and the image taking operation is started with the movement of the zooming optical system 7 by the operation of the zoom control switch 1, the zooming optical system 7 can be driven to the preset position at the maximum drive speed in response to the turn-on again of the fast position preset zoom switch 20.

In the following there will be explained the memory setting sequence for the preset position to be employed in the "memory position preset zoom control".

In this memory setting sequence, the operator in advance moves the zooming optical system 7 to a desired position to be preset and, in a state where the position memory switch 25 is thereafter turned on, the CPU 6 memorizes, as the preset position, the position of the zooming optical system 7 (actual position detected through the position detector 16) when the memory position preset zoom switch 21 is shifted from the off-state to the on-state.

Figure 11:
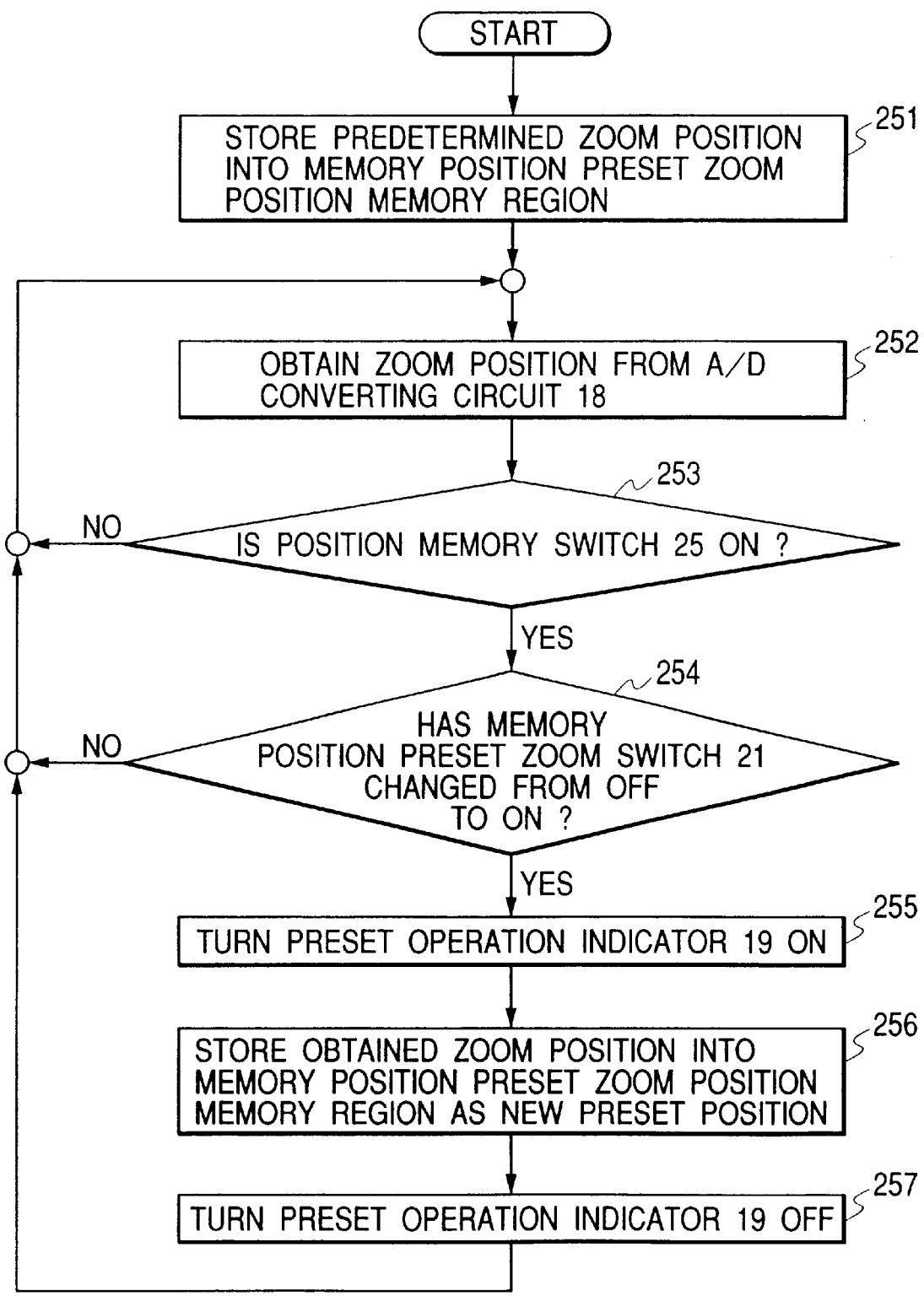
FIG. 11 is a memory setting flow chart for a preset position to be employed in the memory position preset zoom control in the lens apparatus of the above-mentioned third embodiment.

The process of the CPU 6 in the above-described sequence will be explained with reference to FIG. 11. At first, as an initialization, a predetermined zoom position, such as the wide angle end, is memorized as the preset position in the memory position preset zoom position memory area provided in the memory 6a (step 251). The preset position in such initialization may be the position of the zooming optical system 7 when the power supply of the lens apparatus is turned on, or a position of the zooming optical system 7 desired by the operator, or a position of the zooming optical system 7 selected while the lens apparatus is powered previous time.

Then the zoom position is acquired from the A/D conversion circuit 18 (step 252). Then there is discriminated whether the position memory switch 25 is turned on (step 253), and, if not turned on, the position of the zooming optical system 7 is acquired again from the A/D conversion circuit 18 (step 252).

If the position memory switch 25 is turned on, there is discriminated whether the memory position preset zoom switch 21 has been shifted from the off-state to the on-state (step 254), and, if not shifted, the sequence returns to the step 252.

If the memory position preset zoom switch 21 has been shifted from the off-state to the on-state, the preset operation indicator 19 is turned on for indicating that the memory operation of the preset position is executed (step 255), and the position of the zooming optical system 7 acquired in the step 252 is memorized as a new preset position in the memory position preset zoom position memory area (step 256). Thereafter the preset operation indicator 19 is turned off (step 257).

In the following there will be explained the memory setting sequence for the preset speed to be employed in the "memory position preset zoom control".

In this memory setting sequence, the operator operates the zoom control switch 1 to move in advance the zooming optical system 7 with a desired speed to be preset, and, in such state, the CPU 6 memorizes, as the preset speed, the drive speed of the zooming optical system 7 (actual drive speed detected through the speed detector 13) when the speed memory switch 26 is shifted from the off-state to the on-state.

Figure 12:
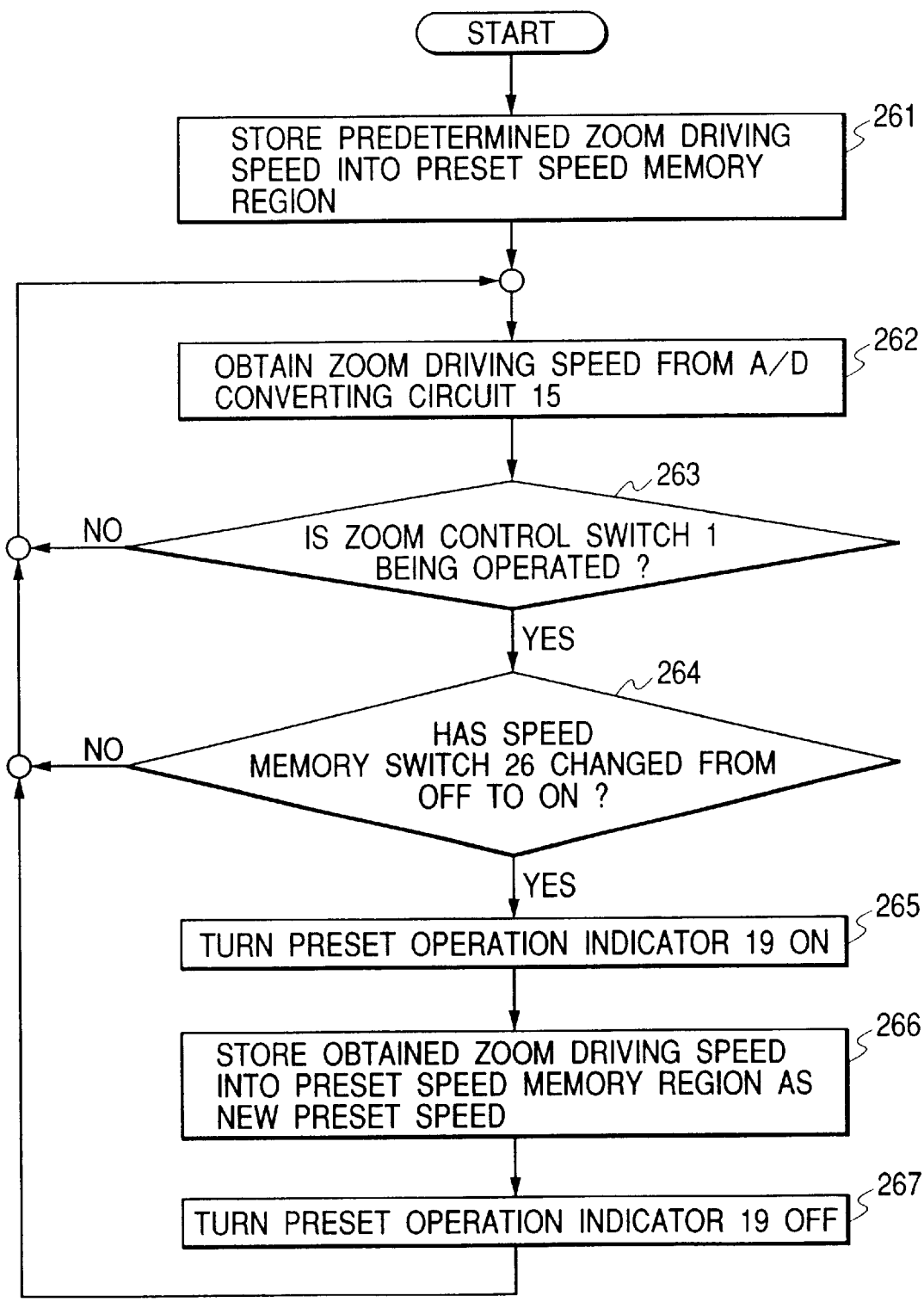
FIG. 12 is a memory setting flow chart for a preset speed to be employed in the memory position preset zoom control in the lens apparatus of the above-mentioned third embodiment.

The process of the CPU 6 in the above-described sequence will be explained with reference to FIG. 12. At first, as an initialization, a predetermined zoom driving speed, such as the maximum speed, is memorized as the preset speed in the preset speed memory area provided in the memory 6a (step 261). The preset speed in such initialization may be the zoom driving speed desired by the operator, or a zoom driving speed selected while the lens apparatus is powered previous time.

Then the drive speed of the zooming optical system 7 is acquired from the A/D conversion circuit 15 (step 262). Then there is discriminated whether the zoom control switch 1 is operated by acquiring the data of the A/D conversion circuit 5 (step 263), and, if not operated, the zoom speed is acquired again from the A/D conversion circuit 15 (step 262).

If the zoom control switch 1 is operated, there is discriminated whether the speed memory switch 26 has been shifted from the off-state to the on-state (step 264), and, if not shifted, the sequence returns to the step 262.

If the speed memory switch 26 has been shifted from the off-state to the on-state, the preset operation indicator 19 is turned on for indicating that the memory operation of the preset speed is executed (step 265), and the speed of the zooming optical system 7 acquired in the step 262 is memorized as a new preset speed in the preset speed memory area (step 266). Thereafter the preset operation indicator 19 is turned off (step 267).

After the preset position and the preset speed are memorized in this manner and the image taking operation is started with the movement of the zooming optical system 7 by the operation of the zoom control switch 1, the zooming optical system 7 can be driven to the preset position at the preset speed in response to the turn-on again of the memory position preset zoom switch 21.

In the present embodiment, the preset position and the preset speed are memorized by the memory instructing operations of the separate memory switches 25, 26, so that, in case it is desired to alter either one of the preset position and the preset speed, such desired preset information alone can be rememorized and the convenience of use can therefore be improved.

In the following there will be explained the memory setting sequence for the preset direction to be employed in the "speed preset zoom control". The memory setting sequence for the preset speed to be employed in the "speed preset zoom control" is same as that for the preset speed employed in the "memory position preset zoom control" explained in the foregoing.

In the memory setting sequence for the preset direction, the operator operates the zoom control switch 1 to move in advance the zooming optical system 7 with a desired direction to be preset, and, in such state, the CPU 6 memorizes the drive direction of the zooming optical system 7 (actual drive direction detected from the output of the speed detector 13) as the preset direction when the direction memory switch 27 is shifted from the off-state to the on-state.

The process of the CPU 6 in the above-described sequence will be explained with reference to FIG. 13. At first, as an initialization, a predetermined zooming direction, such as the telephoto side or the wide angle side, is memorized as the preset direction in a preset direction memory area provided in the memory 6a (step 351). The preset direction in such initialization may be the zooming direction desired by the operator or a zooming direction selected while the lens apparatus is powered previous time.

Then the drive direction of the zooming optical system 7 is acquired from the A/D conversion circuit 15 (step 352). Then there is discriminated whether the zoom control switch 1 is operated by acquiring the data of the A/D conversion circuit 5 (step 353), and, if not operated, the zooming direction is acquired again from the A/D conversion circuit 15 (step 352).

If the zoom control switch 1 is operated, there is discriminated whether the direction memory switch 27 has been shifted from the off-state to the on-state (step 354), and, if not shifted, the sequence reruns to the step 352.

If the direction memory switch 27 has been shifted from the off-state to the on-state, the preset operation indicator 19 is turned on for indicating that the memory operation of the preset direction is executed (step 355), and the zooming direction acquired in the step 352 is memorized as a new preset direction in the preset zoom direction memory area (step 356). Thereafter the preset operation indicator 19 is turned off (step 357).

After the preset speed and the preset direction are memorized in this manner and the image taking operation is started, the zooming optical system 7 can be driven with the preset speed in the preset direction, in response to the turn-on of the speed preset zoom switch 22.

In the present embodiment, the preset speed and the preset direction are memorized by the memory instructing operations of the separate memory switches 26, 27, so that, in case it is desired to alter either one of the preset speed and the preset direction, such desired preset information alone can be rememorized and the convenience of use can therefore be improved.

In the following there will be explained the memory setting sequence for the preset position to be employed in the "boomerang zoom control".

In this memory setting sequence, the operator in advance moves the zooming optical system 7 to a desired position to be preset, and, in a state where the position memory switch 25 is turned on, the CPU 6 memorizes, as the preset position, the position of the zooming optical system 7 (actual drive position detected through the position detector 16) when the boomerang zoom switch 23 is shifted from the off-state to the on-state.

The process of the CPU 6 in the above-described sequence will be explained with reference to FIG. 14. At first, as an initialization, a predetermined zoom position, such as the wide angle end, is memorized as the preset position in a boomerang zoom position memory area provided in the memory 6a (step 451). The preset position in such initialization may be the position of the zooming optical system 7 when the power supply of the lens apparatus is turned on, or the position of the zooming optical system 7 desired by the operator, or a position of the zooming optical system 7 selected in the course of power supply of the lens apparatus previous time.

Then the position of the zooming optical system 7 is acquired from the A/D conversion circuit 18 (step 452). Then there is discriminated whether the position memory switch 25 is turned on (step 453), and, if not turned on, the position of the zooming optical system 7 is acquired again from the A/D conversion circuit 18 (step 452).

If the position memory switch 25 is operated, there is discriminated whether the boomerang zoom switch 23 has been shifted from the off-state to the on-state (step 454), and, if not shifted, the sequence returns to the step 452.

If the boomerang zoom switch 23 has been shifted from the off-state to the on-state, the preset operation indicator 19 is turned on to indicate that the memory of the preset position is executed (step 455) and the position of the zooming optical system 7 acquired in the step 452 is memorized as a new preset position in the boomerang zoom position memory area (step 456). Thereafter the preset operation indicator 19 is turned off (step 457).

After the preset position is memorized in this manner and the image taking operation is initiated with the movement of the zooming optical system 7 by the operation of the zoom control switch 1, in response to the turn-on again of the boomerang zoom switch 23, the position of the zooming optical system 7 detected through the position detector 16 is memorized in the memory 6a at the timing of such turn-on and the zooming optical system 7 is driven to the preset position with the maximum driving speed. Then, in response to the turn-off of the boomerang zoom switch 23 after the image taking operation in the foregoing state, the zooming optical system 7 returns with the maximum driving speed to the original position memorized at the time when the boomerang zoom switch 23 is turned on thereby enabling the image taking operation in such original position.

In the present embodiment, as explained in the foregoing, in executing any of the "fast position preset zoom control", "memory position preset zoom control" and "boomerang zoom control" which are to be executed utilizing the preset position, among the four preset drive controls, the preset position can be memorized in the memory 6a by turning on the same position memory switch 25. Also in executing any of the "memory position preset zoom control" and "speed preset zoom control" to be executed utilizing the preset speed, the preset speed can be memorized in the memory 6a by turning on the same speed memory switch 26. Consequently, in comparison with the conventional configuration in which the memory instructing operation means is provided for each preset drive control, it is rendered possible to improve the operability and to reduce the dimension and weight of the lens apparatus or the lens drive unit.

Also in the present embodiment, there may be adopted, as explained in the second embodiment, a memory setting sequence taking into consideration a case of setting different preset speeds respectively for the "memory position preset zoom control" and the "speed preset zoom control".

Also in the foregoing embodiments, there has been explained a case of memorizing the preset speed and the preset direction after discriminating that the zoom control switch 1 is operated, but it is also possible to memorize the preset speed and the preset direction after discriminating that the zooming optical system 7 is driven for example through a change in the position signal outputted from the position detector.

Also in the foregoing embodiment, the drive speed and the drive direction of the zooming optical system 7 are detected from the speed signal outputted from the speed detector 13, but they may also be detected by acquiring the position signal outputted from the position detector at a constant interval or from the level and polarity of a command signal outputted corresponding to the operation of the zoom control switch 1.

Also in the foregoing embodiments, the preset position is memorized by shifting the fast preset position switch 20 or another switch from the off-state to the on-state while the memory switch 24 or the position memory switch 25 is turned on, but it may be memorized in response to the simultaneous turn-on operation of the memory switch 24 or the position memory switch 25 and the fast preset position switch 20 or another switch.

Also in the foregoing embodiments, there has been explained a configuration having the preset drive control functions of four kinds, but the present invention is likewise applicable to a case with the preset drive control functions of plural kinds other than the aforementioned four kinds. Also the content of the preset drive controls may be other than the aforementioned four kinds.

Also in the foregoing embodiments, the memory switches 24, 25 to 27 are composed of single switches, but it is also possible to provide a memory switch including two or more single switches for preventing from wrong operation or the like and to execute memory of the preset information in response to the operation of such two single switches.

Also in the foregoing embodiments, there has been explained the preset drive control on the zooming optical system, but the present invention is likewise applicable to the preset drive control for optical adjustment means other than the zooming optical system, for example for a focusing optical system or for an iris.

According to the present invention, as explained in the foregoing, in executing any of the preset drive controls of plural kinds, the preset information required for each preset drive control can be memorized by turning on same memory instructing operation means or the memory instructing operation means of a same set. Consequently, in comparison with the conventional configuration in which the memory instructing operation means is provided for each preset drive control, it is rendered possible to improve the operability and to reduce the dimension and weight of the lens apparatus or the lens drive unit.

Also according to the present invention, in the preset drive controls of plural kinds utilizing the preset information of a common kind, the preset information required for each preset drive control can be memorized by turning on same memory instructing operation means or the memory instructing operation means of a same set. Consequently, in comparison with the conventional configuration in which the memory instructing operation means is provided for each preset drive control, it is rendered possible to improve the operability and to reduce the dimension and weight of the lens apparatus or the lens drive unit.

Also in case there can be selectively executed the preset drive controls of plural kinds that are to be executed utilizing the preset information of a same kind among the preset information obtained from the actual drive state of the optical adjustment means or from the drive command therefor, the predetermined preset information employed in the preset drive control selected by the operation of the control selecting operation means is memorized in response to the operation of the memory instructing operation means, whereby the preset information can be memorized respectively corresponding to the preset drive controls of plural kinds to be executed utilizing the preset information of the aforementioned same kind. It is thus rendered possible to expand the range of the image taking techniques utilizing such preset drive controls of plural kinds and to realize the preset drive control function in a more effective manner.

Also in the foregoing configurations, there may be provided display means for indicating that the memory of the preset information in the memory means, thereby causing the operator to clearly recognize when the preset information is memorized.

What is claimed is:

1. An optical apparatus including optical adjusting means such as a lens, position detecting means for detecting an actual drive position of said optical adjusting means, and speed detecting means for detecting an actual drive speed of said optical adjusting means, and performing a plural kinds of preset drive controls using preset information memorized within memory means, which includes a preset position information and a preset speed information, said apparatus comprising:

control selection operation means operated to select one of said plural kinds of said preset drive controls; and memory instructing operation means operated to instruct said memory means so as to memorize a plural kinds of said preset informations used by said plural kinds of preset drive controls, and used in common for performing a memory instructing operation of said preset information with respect to said plural kinds of preset drive controls, wherein when said control selection operation means is operated in a state that said memory instructing operation means is operated, the actual drive position of said optical adjusting means detected by said position detecting means is memorized as the preset position information into said memory means, and wherein when said memory instructing operation means is operated in a state that said optical adjusting means is driven and said control selection operation means is operated, at least the actual drive speed of said optical adjusting means detected by said speed detecting means is memorized as the preset speed information into said memory means.

2. An optical apparatus according to claim 1, wherein after the preset information is memorized into said memory means, said preset drive control is again started by the operation of said control selection operation means.

3. A camera system comprising the optical apparatus according to claim 2 and a television camera or a video camera to which the optical apparatus is attached.

4. A camera system comprising the optical apparatus according to claim 1 and a television camera or a video camera to which the optical apparatus is attached.

5. An optical apparatus drive unit attached to or connected to an optical apparatus body having an optical adjusting means such as a lens, and including position detecting means for detecting an actual drive position of said optical adjusting means and speed detecting means for detecting an actual drive speed of said optical adjusting means, and performing a plural kinds of preset drive controls using preset information memorized within memory means, which includes a preset position information and a preset speed information, said apparatus comprising:

control selection operation means operated to select one of said plural kinds of said preset drive controls; and memory instructing operation means operated to instruct said memory means so as to memorize a plural kinds of said preset informations used by said plural kinds of preset drive controls, and used in common for performing a memory instructing operation of said preset information with respect to said plural kinds of preset drive controls, wherein when said control selection operation means is operated in a state that said memory instructing operation means is operated, the actual drive position of said optical adjusting means detected by said position detecting means is memorized as the preset position information into said memory means, and wherein when said memory instructing operation means is operated in a state that said optical adjusting means is driven and said control selection operation means is operated, at least the actual drive speed of said optical adjusting means detected by said speed detecting means is memorized as the preset speed information into said memory means.

6. An optical apparatus drive until according to claim 5, wherein after the preset information is memorized into said memory means, said preset drive control is again started by the operation of said control selection operation means.

7. A camera system comprising the optical apparatus drive unit according to claim 6, the optical apparatus body to which the optical apparatus drive unit is attached or connected, and a television camera or video camera to which the optical apparatus body is attached.

8. A camera system comprising the optical apparatus drive unit according to claim 5, the optical apparatus body to which the optical apparatus drive unit is attached or connected, and a television camera or video camera to which the optical apparatus body is attached.

9. An optical apparatus including optical adjusting means such as a lens, position detecting means for detecting an actual drive position of said optical adjusting means, and speed detecting means for detecting an actual drive speed of said optical adjusting means, and performing a plural kinds of preset drive controls using preset information memorized within memory means, which includes a preset position information and a preset speed information, said apparatus comprising:

control selection operation means operated to select one of said plural kinds of said preset drive controls; and memory instructing operation means operated to instruct said memory means so as to memorize a plural kinds of said preset informations used by said plural kinds of preset drive controls, and used in common for performing a memory instructing operation of said preset information with respect to said plural kinds of preset drive controls, wherein when said control selection operation means is operated in a state that said memory instructing operation means is operated, the actual drive position of said optical adjusting means detected by said position detecting means is memorized as the preset position information into said memory means, and wherein when said optical adjusting means is driven and said memory instructing operation means is operated, at least the actual drive speed of said optical adjusting means detected by said speed detecting means is memorized as the preset speed information into said memory means.

10. An optical apparatus according to claim 9, wherein after the preset information is memorized into said memory means, said preset drive control is again started by the operation of said control selection operation means.

11. A camera system comprising the optical apparatus according to claim 10 and a television camera or a video camera to which the optical apparatus is attached.

12. An optical apparatus according to claim 9, further comprising direction detecting means for detecting an actual drive direction of said optical adjusting means, and wherein when said optical adjusting means is driven and said memory instructing operation means is operated, at least the actual drive direction of said optical adjusting means detected by said direction detecting means is memorized as a preset direction information into said memory means.

13. A camera system comprising the optical apparatus according to claim 12 and a television camera or a video camera to which the optical apparatus is attached.

14. A camera system comprising the optical apparatus according to claim 9 and a television camera or a video camera to which the optical apparatus is attached.

15. An optical apparatus drive unit attached to or connected to an optical apparatus body having an optical adjusting means such as a lens, and including position detecting means for detecting an actual drive position of said optical adjusting means and speed detecting means for detecting an actual drive speed of said optical adjusting means, and performing a plural kinds of preset drive controls using preset information memorized within memory means, which includes a preset position information and a preset speed information, said apparatus comprising:

control selection operation means operated to select one of said plural kinds of said preset drive controls; and memory instructing operation means operated to instruct said memory means so as to memorize a plural kinds of said preset informations used by said plural kinds of preset drive controls, and used in common for performing a memory instructing operation of said preset information with respect to said plural kinds of preset drive controls, wherein when said control selection operation means is operated in a state that said memory instructing operation means is operated, the actual drive position of said optical adjusting means detected by said position detecting means is memorized as the preset position information into said memory means, and wherein when said optical adjusting means is driven and said memory instructing operation means is operated, at least the actual drive speed of said optical adjusting means detected by said speed detecting means is memorized as the preset speed information into said memory means.

16. An optical apparatus drive unit according to claim 15, wherein after the preset information is memorized into said memory means, said preset drive control is again started by the operation of said control selection operation means.

17. A camera system comprising the optical apparatus drive unit according to claim 16, the optical apparatus body to which the optical apparatus drive unit is attached or connected, and a television camera or video camera to which the optical apparatus body is attached.

18. An optical apparatus drive unit according to claim 15, further comprising direction detecting means for detecting an actual drive direction of said optical adjusting means, and wherein when said optical adjusting means is driven and said memory instructing operation means is operated, at least the actual drive direction of said optical adjusting means detected by said direction detecting means is memorized as a preset direction information into said memory means.

19. A camera system comprising the optical apparatus drive unit according to claim 18, the optical apparatus body to which the optical apparatus drive unit is attached or connected, and a television camera or video camera to which the optical apparatus body is attached.

20. A camera system comprising the optical apparatus drive unit according to claim 15, the optical apparatus body to which the optical apparatus drive unit is attached or connected, and a television camera or video camera to which the optical apparatus body is attached.

* * * * *